US011858328B2

(12) United States Patent
Srivastava et al.

(10) Patent No.: US 11,858,328 B2
(45) Date of Patent: Jan. 2, 2024

(54) INTERFACE FOR COUPLING ELECTRIC BATTERY AND VEHICLE SYSTEMS

(71) Applicant: Ample Inc., San Francisco, CA (US)

(72) Inventors: Ankit Srivastava, San Francisco, CA (US); Khaled Walid Hassounah, San Francisco, CA (US); Harsh Jain, San Francisco, CA (US)

(73) Assignee: Ample Inc., San Francisco, CA (US)

(*) Notice: Subject to any disclaimer, the term of this patent is extended or adjusted under 35 U.S.C. 154(b) by 314 days.

(21) Appl. No.: 17/221,510

(22) Filed: Apr. 2, 2021

(65) Prior Publication Data
US 2022/0314769 A1  Oct. 6, 2022

(51) Int. Cl.
| | |
|---|---|
| *B60K 1/04* | (2019.01) |
| *B60L 50/60* | (2019.01) |
| *B60L 53/30* | (2019.01) |
| *B60L 53/80* | (2019.01) |
| *H01M 50/204* | (2021.01) |

(52) U.S. Cl.
CPC .............. *B60K 1/04* (2013.01); *B60L 50/66* (2019.02); *B60L 53/305* (2019.02); *B60L 53/80* (2019.02); *H01M 50/204* (2021.01); *B60K 2001/0455* (2013.01); *H01M 2220/20* (2013.01)

(58) Field of Classification Search
CPC ............ B60K 1/004; B60K 2001/0455; B60K 2001/0438; B60L 50/66; B60L 53/305; B60L 53/80; H01M 50/204; H01M 2220/20
See application file for complete search history.

(56) References Cited

U.S. PATENT DOCUMENTS

| | | | |
|---|---|---|---|
| 8,454,377 B2* | 6/2013 | Heichal | .............. B60K 1/04 439/247 |
| 10,112,471 B2* | 10/2018 | Higuchi | ................ B60L 53/80 |
| 11,407,298 B1* | 8/2022 | Boe | ..................... B62D 55/065 |
| 2011/0112710 A1 | 5/2011 | Meyer-Ebeling et al. | |
| 2011/0223459 A1 | 9/2011 | Heichal | |
| 2012/0009804 A1 | 1/2012 | Heichal et al. | |
| 2012/0158229 A1 | 6/2012 | Schaefer | |
| 2013/0221916 A1 | 8/2013 | Kelty et al. | |
| 2014/0175873 A1 | 6/2014 | Kishimoto et al. | |
| 2016/0137093 A1 | 5/2016 | Shrinkle | |
| 2016/0209226 A1 | 7/2016 | Nagy et al. | |
| 2016/0368464 A1 | 12/2016 | Hassounah | |

(Continued)

OTHER PUBLICATIONS

International Search Report for PCT Application No. PCT/US2022/071461, dated Jul. 22, 2022.

(Continued)

*Primary Examiner* — James A English
*Assistant Examiner* — James J Triggs
(74) *Attorney, Agent, or Firm* — Intrinsic Law Corp.

(57) ABSTRACT

An apparatus for electrically and mechanically coupling battery modules to an electric vehicle includes an interface plate and one or more battery trays. The interface plate includes an electrical output that electrically couples the interface plate to the vehicle. The interface plate also includes an electrical input that is electrically coupled to the electrical output. The battery tray is configured to receive a plurality of replaceable battery modules and is releasably mechanically coupled to the interface plate.

20 Claims, 21 Drawing Sheets

(56) References Cited

U.S. PATENT DOCUMENTS

| | | |
|---|---|---|
| 2016/0369826 A1 | 12/2016 | Hassounah et al. |
| 2017/0225662 A1 | 8/2017 | Newman et al. |
| 2019/0051947 A1 | 2/2019 | Scheucher |
| 2019/0081502 A1 | 3/2019 | Botts et al. |
| 2020/0406780 A1 | 12/2020 | Hassounah |

OTHER PUBLICATIONS

ISA, "International Search Report", PCT/US20/40070, dated Nov. 17, 2020.

* cited by examiner

INTERFACE FOR COUPLING ELECTRIC BATTERY AND VEHICLE SYSTEMS

TECHNICAL FIELD

This application relates generally to electric vehicle systems and their battery components.

BACKGROUND

Various types of automotive vehicles, such as electric vehicles (EVs), extended-range electric vehicles, and hybrid electric vehicles are equipped with an energy storage system that requires periodic charging. Typically, this energy storage system may be charged by connecting it to a power source, such as an AC supply line. While it may be advantageous to recharge the vehicle's energy storage system before or after each vehicle use, current systems require the vehicle operator to manually plug the power supply line into the vehicle. Such manual operation may not always be convenient for the vehicle operator, which may result in missed charging instances and/or subsequently degraded vehicle performance.

Vehicles have become culturally integral and indispensable to the modern economy. Unfortunately, fossil fuels— typically used to power such vehicles—have many drawbacks, including but not limited to: a dependence on limited foreign sources of oil and natural gas; foreign sources are often in volatile geographic locations; and, most egregious, and fossil fuels produce pollution and climate change.

One way to address these problems is to increase the fuel economy of these vehicles. Recently, gasoline-electric hybrid vehicles have been introduced, which consume substantially less fuel than their traditional internal combustion counterparts, i.e., they have better fuel economy. However, gasoline-electric hybrid vehicles do not eliminate the need for fossil fuels, as they still require an internal combustion engine in addition to the electric motor.

Another way to address this problem is to use renewable resource fuels such as bio-fuels. While successful in other countries, such as Brazil, bio-fuels remain more expensive than their antiquated counterparts. Yet, more importantly, bio-fuels are equally contributing to greenhouse gasses and arguably leave a larger carbon footprint, when analyzed from the totality of production.

A more popular approach has been to use clean[er] technologies, such as electric motors powered by fuel cells or batteries. However, many of these clean technologies are not yet practical. For example, fuel cell vehicles are still under development and are expensive. Hydrogen powered fuel cells first require the chemical extraction (via electrolysis) of diatomic hydrogen ($H_2$) and transportation thereof inside a vehicle, which is inherently dangerous.

The greatest impediment to EVs, particularly to extended range EVs, has been and remains to be antiquated battery technology. Battery technology has experienced a modicum of recent progression; however, batteries contribute as much as 40% to the cost of a new vehicle. Rechargeable battery technology has simply not advanced to the point where mass-produced and cost-effective batteries can power EVs for long distances.

Present electro-chemical (rechargeable batteries) technology does not provide an energy density comparable to chemically stored sources. Gasoline, diesel, ethanol, methanol, etc. all have energy densities close to two orders of magnitude greater than lithium ion rechargeable batteries. Therefore, even on a typical fully charged electric vehicle battery, the electric vehicle may only be able to travel about 70 miles (EPA Nissan Leaf) before needing to be recharged. For non-hybrid vehicles, range is a strict limited factor conjuring images of becoming stranded with no charging capacity nearby.

Furthermore, batteries can take many hours to recharge and may need to be recharged overnight. State and local government have recognized a need for charging stations to help mitigate the drawbacks (impediments, more accurately) to electric vehicle usage and proliferation. An electric vehicle charging station is an element in an infrastructure that supplies electric energy for the recharging of electric vehicles, such as plug-in electric vehicles, including all-electric cars, neighborhood electric vehicles and plug-in hybrids.

As plug-in hybrid electric vehicles and electric vehicle ownership is expanding, there is a growing need for widely distributed publicly accessible charging stations, some of which support faster charging at higher voltages and currents than are available from residential electric vehicle supply equipment (EVSE). Many charging stations are on-street facilities provided by electric utility companies or located at retail shopping centers and operated by many private companies. These charging stations provide one or a range of heavy duty or special connectors that conform to the variety of electric charging connector standards.

Alas, charging stations are not ubiquitous. And, despite higher current capacity thereby reducing recharge times, quick charges may take several hours. Therefore, present EV owners must plan trips carefully and prudently. Additionally, longer trips may simply be precluded for lack of infrastructure and paucity of vehicle range.

There is a need for a user-friendly system and method for interchanging modular battery pack at any remote location without the long charging times in existing systems.

SUMMARY

Example embodiments described herein have innovative features, no single one of which is indispensable or solely responsible for their desirable attributes. The following description and drawings set forth certain illustrative implementations of the disclosure in detail, which are indicative of several example ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to an apparatus for electrically and mechanically coupling removeable battery modules to a vehicle. The apparatus comprises an interface plate configured to be mechanically coupled to the vehicle, the interface plate comprising: an interface plate electrical output that electrically couples the interface plate to the vehicle; and an interface plate electrical input electrically coupled to the interface plate electrical output. The apparatus further comprises battery trays that releasably receive the removeable battery modules, each battery tray releasably mechanically coupled to the interface plate and comprising: one or more battery module connectors releasably electrically coupled to corresponding one or more battery modules;

and a battery tray electrical output that electrically couples the one or more battery module connectors to the interface plate electrical input.

In one or more embodiments, the interface plate and each battery tray include complementary threaded fasteners that releasably mechanically couple the battery tray and the interface plate. In one or more embodiments, the interface plate further includes: first mechanical threaded fasteners; motors, each motor in mechanical communication with a corresponding first threaded fastener; and a controller in electrical communication with the motors. Each battery tray further includes second threaded fasteners, each second threaded fastener aligned with a corresponding first threaded fastener. The controller sends a first signal to each motor that causes a corresponding first threaded fastener to mechanically engage the second threaded fastener, and the controller sends a second signal to each motor that causes the corresponding first threaded fastener to mechanically disengage from the respective second threaded fastener.

In one or more embodiments, the interface plate includes a microprocessor in electrical communication with each motor to control whether the corresponding first mechanical threaded fastener engages or disengages from the respective second threaded fastener. In one or more embodiments, the interface plate further includes gear systems, each gear system mechanically translating a rotation of a respective motor to a rotation of a respective first mechanical connector. In one or more embodiments, the first mechanical connector comprises a nut and the second mechanical connector comprises a bolt.

In one or more embodiments, each battery tray includes alignment pegs that define one or more battery module positions to receive the corresponding one or more battery modules on the battery tray. In one or more embodiments, each alignment peg extends from a first end to a second end, the first end disposed on the battery tray, the second end tapering from a first thickness equal to a thickness of the first end to a second thickness that is less than the first thickness. In one or more embodiments, the thickness of the first end is configured to reduce a lateral movement of the respective battery module.

In one or more embodiments, the battery tray electrical output electrically couples outputs of adjacent one or more battery modules to the interface plate electrical input. In one or more embodiments, the interface plate electrical input is electrically coupled to a conductive bus bar or conductive wire that extends to the interface plate electrical output. In one or more embodiments, the interface plate includes a flange that comprises position-indicating marks, the positioning-indicating marks comprising light-emitting diodes (LED), light reflecting material, or machine-detectable markings. In one or more embodiments, the interface plate includes a microprocessor in electrical communication with the position-indicating marks to control the light-emitting diodes, light reflecting material, or machine-detectable markings.

Another aspect of the invention is directed to an interface plate configured to be mechanically coupled to a vehicle. The interface plate comprises an electrical output that electrically and mechanically couples the interface plate to the vehicle; an electrical input that includes first electrical connectors that are configured to mate with complementary electrical connectors in removeable battery trays configured and arranged to hold a plurality of replaceable battery modules; and a conductive bus bar or conductive wire that electrically couples the electrical input to the electrical output.

In one or more embodiments, the interface connector further comprises a flange; and position-indicating marks comprising controllable light-emitting diodes, the positioning-indicating marks disposed on the flange. In one or more embodiments, the interface connector further comprises a microprocessor in electrical communication with the position-indicating marks to control the light-emitting diodes.

BRIEF DESCRIPTION OF THE DRAWINGS

For a fuller understanding of the nature and advantages of the present concepts, reference is made to the following detailed description of preferred embodiments and in connection with the accompanying drawings.

DETAILED DESCRIPTION

Figure 1:
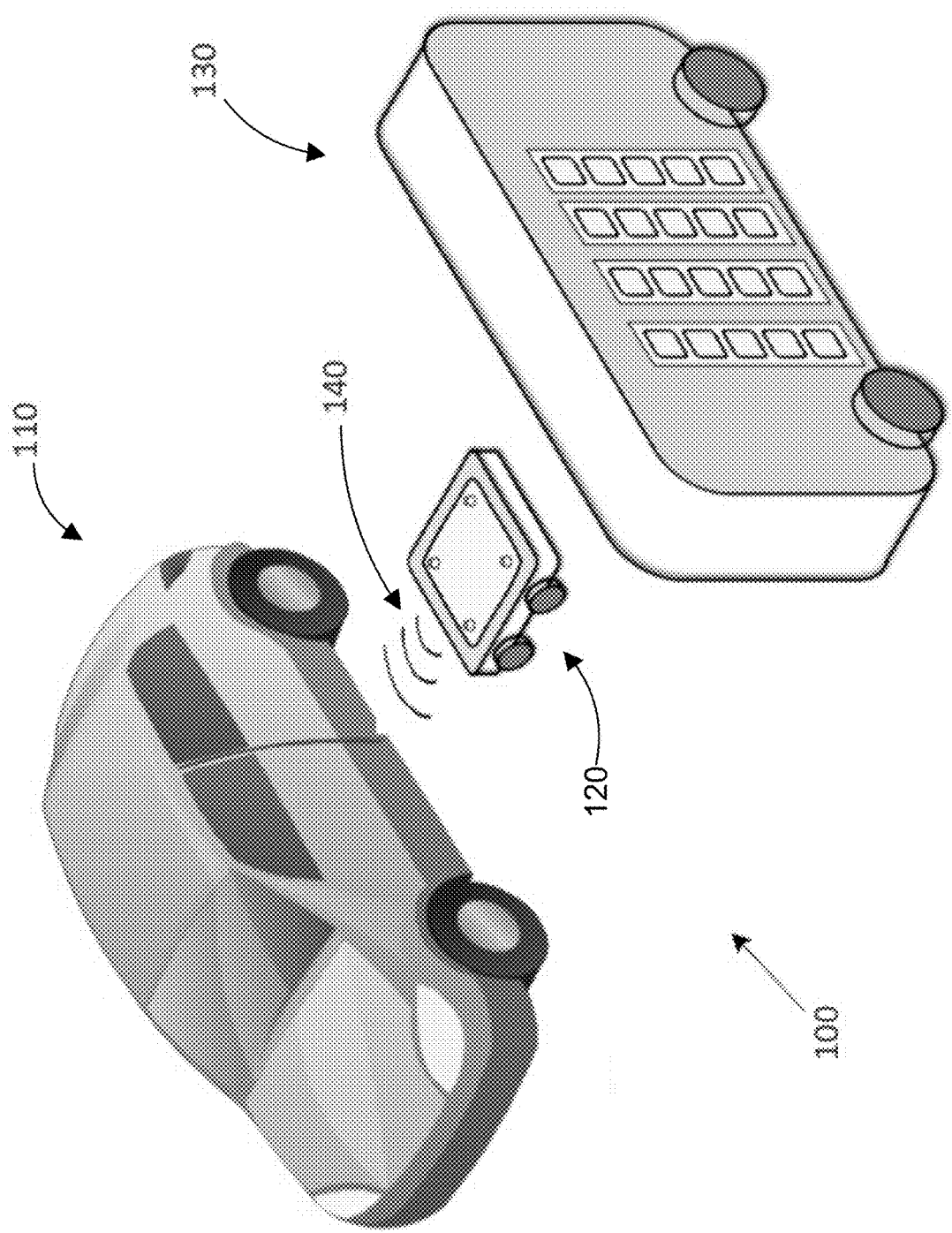
FIG. 1 is an isometric view of a robot-assisted modular battery interchanging system according to one or more embodiments.

FIG. 1 is an isometric view of a robot-assisted modular battery interchanging system 100 according to one or more embodiments. Robot-assisted modular battery interchanging system 100 comprises a battery exchange robot 120 and mobile operations platform 130.

In the most general sense, mobile operations platform 130 is a device responsible for storing batteries, dispensing them when needed, and storing returned empty batteries. In one or more embodiments, the mobile operation platform 130 charges (or maintains pursuant to a battery tender) discharged batteries in place or simply acts as a transport container for batteries to be charged elsewhere, in other embodiments.

Battery exchange robot 120 can be either autonomous or automatic whereby it receives a more explicit instruction code set from mobile operations platform 130. In practice, battery exchange robot 120 uses a relative position sensing technology 140 (such as ultrasonic multilateration, ultrasonic radar, infrared multilateration, LiDAR, or any similar technology) to locate itself relative to vehicle 110. Using its location relative to a fixed point on the vehicle 110 and instructions wirelessly communicated from mobile operations platform 130, battery exchange robot 120 positions itself under the vehicle 110 to remove one or more discharged batteries (e.g., a tray that includes one or more discharged batteries) or to install one or more charged batteries (e.g., a tray that includes one or more charged batteries). Before the battery exchange robot 120 removes or installs batteries, the vehicle 110 is lifted to provide sufficient vertical space for the battery removal and/or installation.

Figure 2:
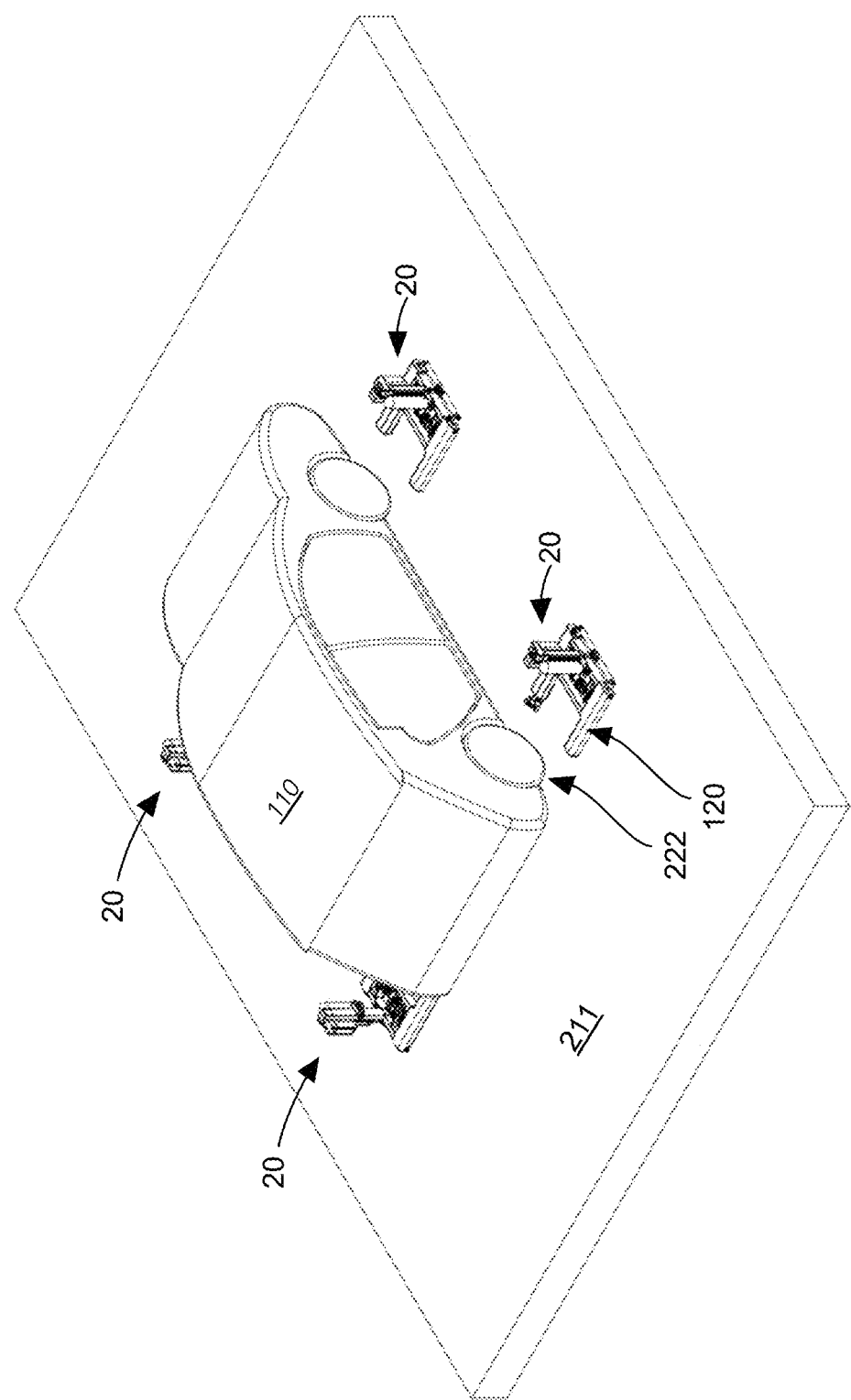
FIG. 2 illustrates an example of semi-autonomous lift systems for lifting a vehicle, according to one or more embodiments.

FIG. 2 illustrates an example of semi-autonomous lift systems 20 for lifting a vehicle, according to one or more embodiments. Each lift system 20 engages a wheel 222 of the vehicle 110. Each wheel 222 can be considered a load for the respective lift system 20. In this example, the wheel 222 may also include a tire, which for the present purposes does not change the method or system of the invention, so the load-bearing arms 120 of lift system 20 can engage a tire as well (just referred to as a wheel for some or all present examples for simplicity). In an embodiment, two parallel load-bearing arms 220 of the lift system 20 cradle the tire/wheel 222 of car 120 and the load thus rests between the two load-bearing arms 220 for raising off of a ground surface 211.

Figure 3:
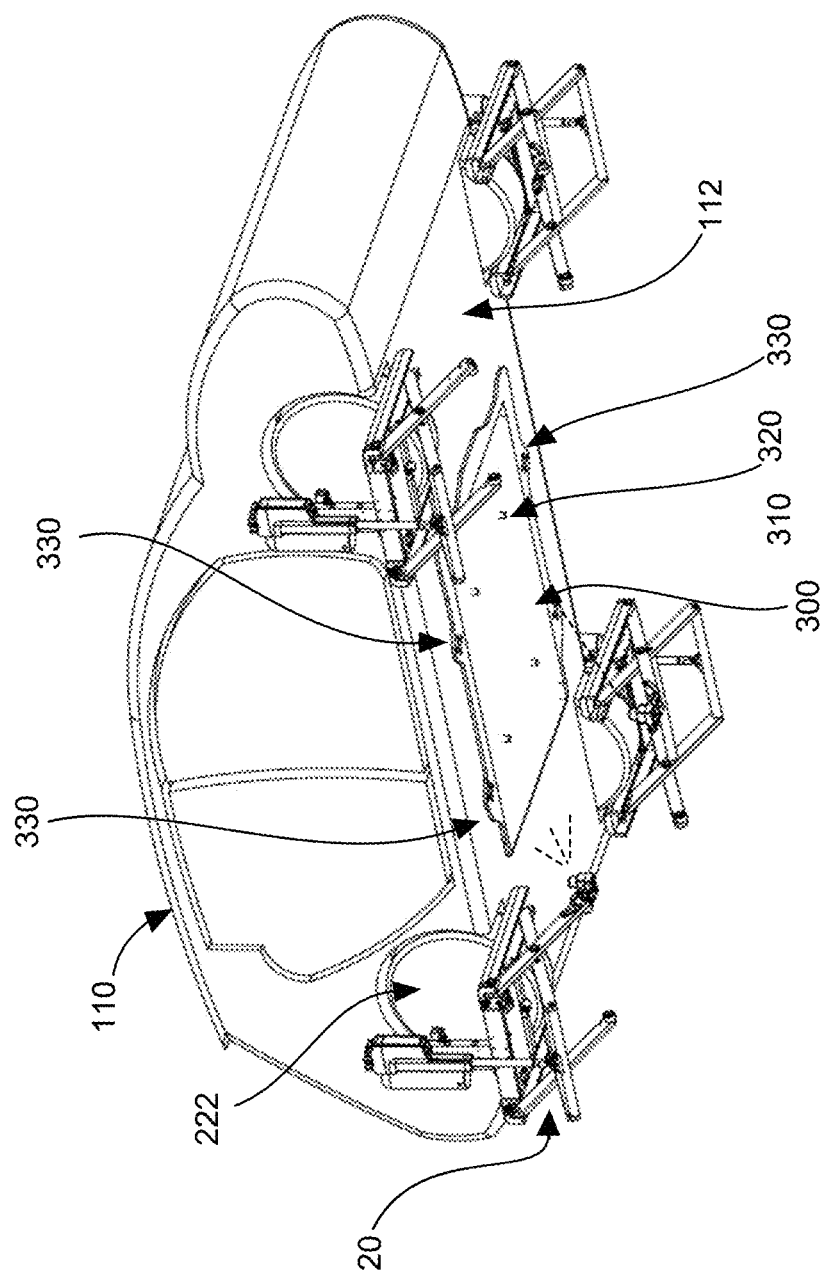
FIG. 3 is an underneath perspective view of the semi-autonomous lift systems illustrated in FIG. 2 engaged with and raising a respective wheel of the vehicle, according to one or more embodiments.

FIG. 3 is an underneath perspective view of the lift system 20 engaged with and raising a respective wheel 222 of the vehicle 110, according to one or more embodiments. Raising the wheels 222 lifts the body of the vehicle 110 (e.g., after compressing the springs of the suspension system) to increase clearance between the underside 112 of the vehicle 110 and the ground surface (e.g., ground surface 211), which allows the battery robot 120 to access a battery storage compartment 300 for the vehicle 110.

The battery storage compartment 300 includes a bottom cover plate 310 that can be secured in place by a plurality of bolts or fasteners 320, which can be removed (e.g., by a machine or service robot) for access to the equipment or batteries lying within cover 310. Also, one or more fiducial or position-indicating marks 330 on the bottom of the battery storage compartment 300 may be used to generally indicate a position with respect to the underside 112 of the vehicle 110.

Figure 4:
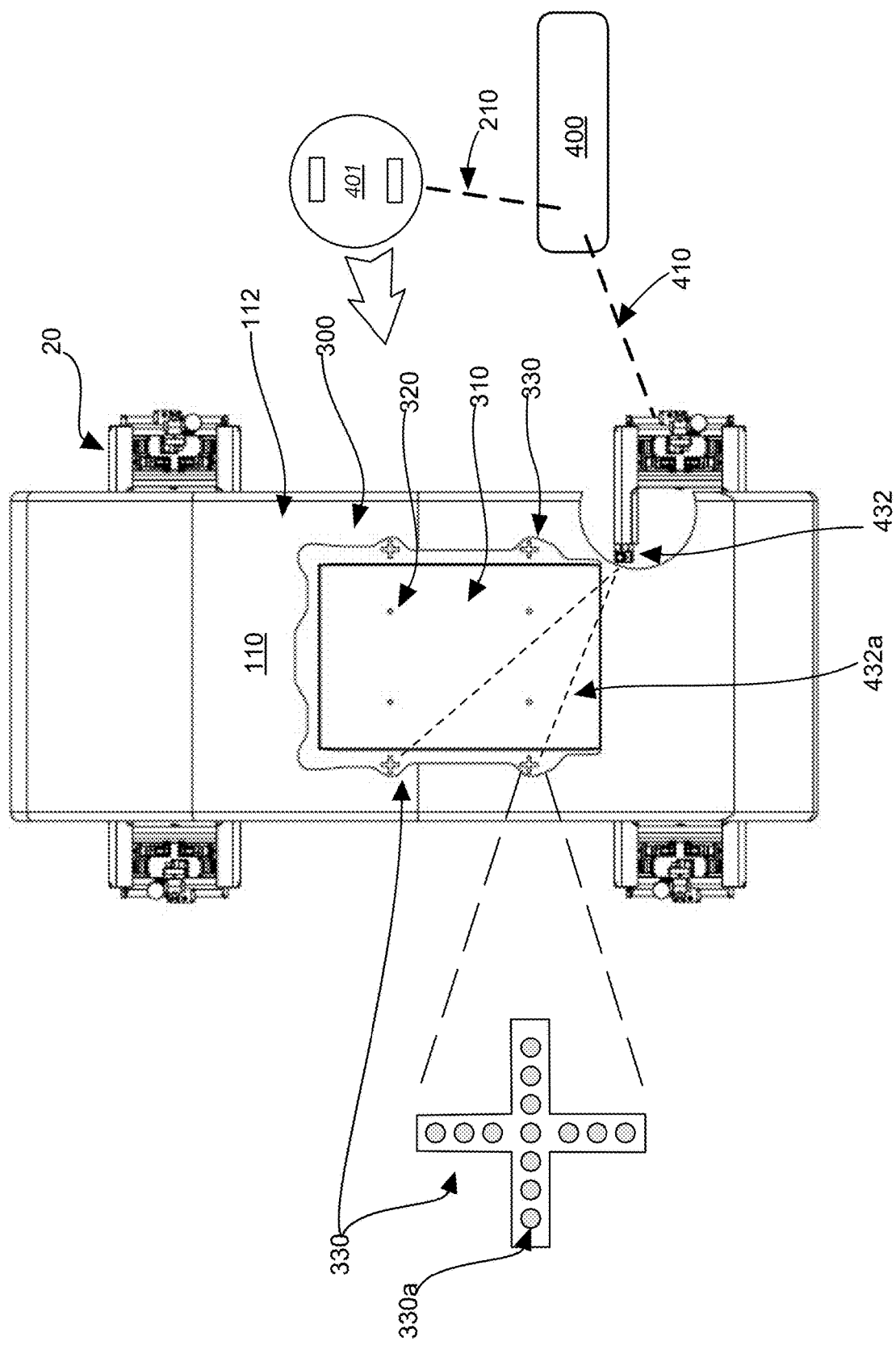
FIG. 4 illustrates a bottom view of the vehicle raised up by a set of the lift systems to access a battery storage compartment, according to one or more embodiments.

FIG. 4 illustrates a bottom view of vehicle 110 raised up by a set of lift systems 20 to access battery storage compartment 300, according to one or more embodiments. In a particular example, one or more under-carriage fiducial position markers 330 on the bottom of the battery storage compartment 300 includes a series of equally-spaced LED light sources 330a arranged in a pair of orthogonal line segments, e.g. in a cross shape (but other configurations are equally possible). The position-indicating marks or fiducial marks 330 can be used to identify, locate, or direct (e.g., through image processing and geometric/trigonometric calculations) other equipment into place with respect to servicing the underside of vehicle 110. An under-carriage camera 432 may use an optical line of sight 432a to one or more position locating marks or fiducial marks 330 to identify, locate or direct other equipment into place with respect to servicing the underside 112 of vehicle 110. For example, the position-locating marks or fiducial marks 330 can be used to guide a service robot 401 using wireless control signals 410. The communication with service robot 201 can take place in some embodiments directly between robot 401 and lift system(s) 20 or may take place through a remote control unit 400 that sends control signals 410 to service robot 401. In some embodiments, service robot 401 is the same as battery exchange robot 120 and/or remote control unit 400 is the same as mobile operations platform 130.

Figure 5:
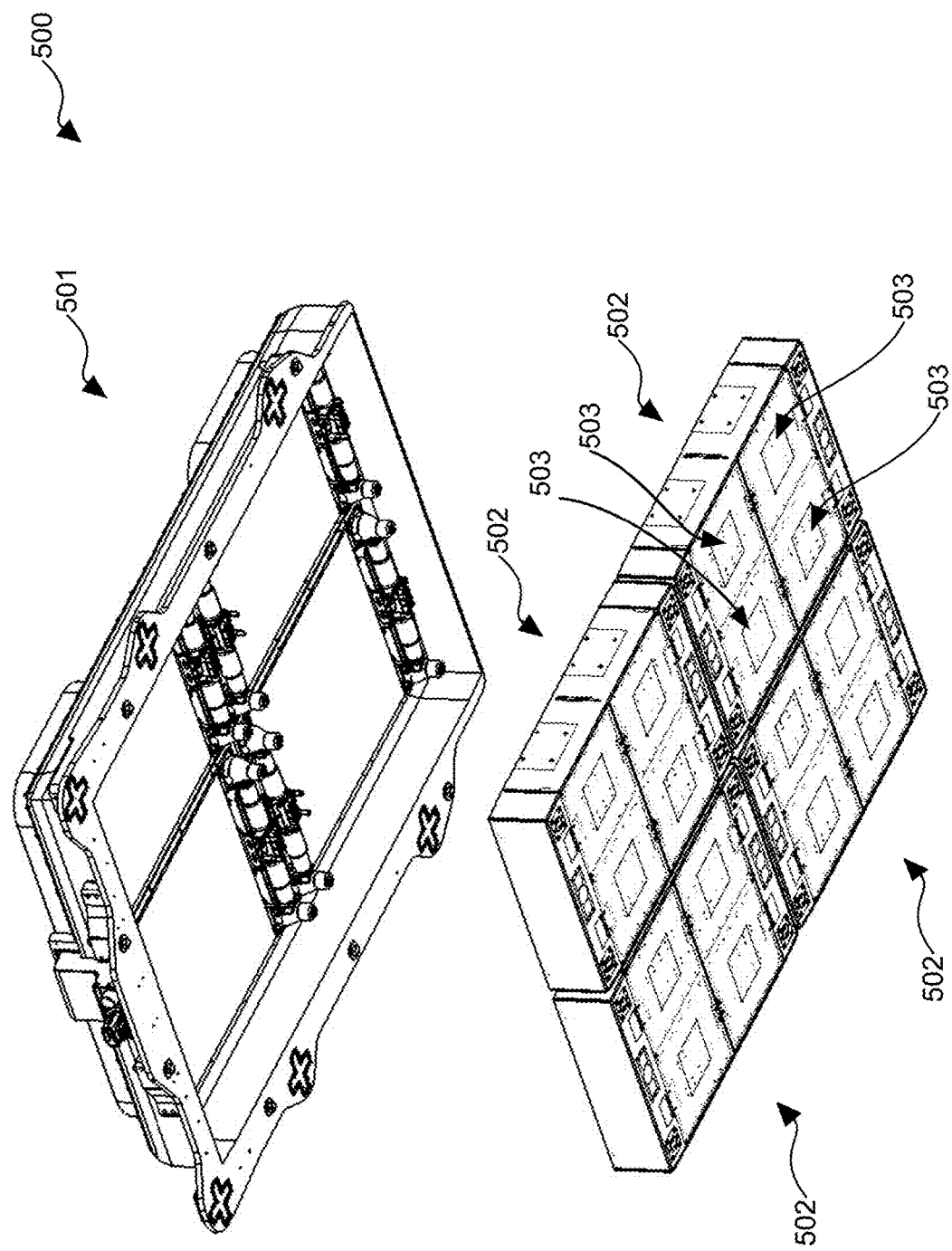
FIG. 5 is an exploded perspective view of a battery storage compartment according to one or more embodiments.

FIG. 5 is an exploded perspective view of a battery storage compartment 500 according to one or more embodiments. In some embodiments, battery storage compartment 500 is an example of battery storage compartment 300.

Battery storage compartment 500 includes an interface plate 501 and removeable battery trays 502. Each battery tray 502 includes removeable battery modules 503, and each battery module 503 can include one or multiple batteries (e.g., rechargeable batteries) to power an electric vehicle. Though 4 battery trays 502 are illustrated in FIG. 5, it is noted that interface plate 501 can be configured to receive fewer or additional battery trays 502. In addition or in the alternative, FIG. 5 illustrates that each battery tray 502 includes 4 battery modules 503, but the battery trays 502 can include fewer or additional batteries in other embodiments. It is also noted that interface plate 501 can receive at least a first battery tray 502 that include first battery modules 503A (not illustrated) and at least a second battery tray 502 that includes second battery modules 503B (not illustrated). The first battery module(s) 503A can include batteries having first specifications or first properties and the second battery module(s) 503B can include batteries having second specifications or second properties where the first specifications/properties are different than or the same as the second specifications/properties.

When the battery modules 503 in a given battery tray 502 are discharged or depleted, the battery tray 502 can be interchanged with a replacement battery tray 602 that includes charged battery modules 503. This eliminates the need to wait several hours for the vehicle's batteries to be recharged at a charging station or at home. The battery modules 503 can then be charged while they remain in the tray 502 or they can be removed from the tray 502 and charged using another apparatus.

Figure 6:
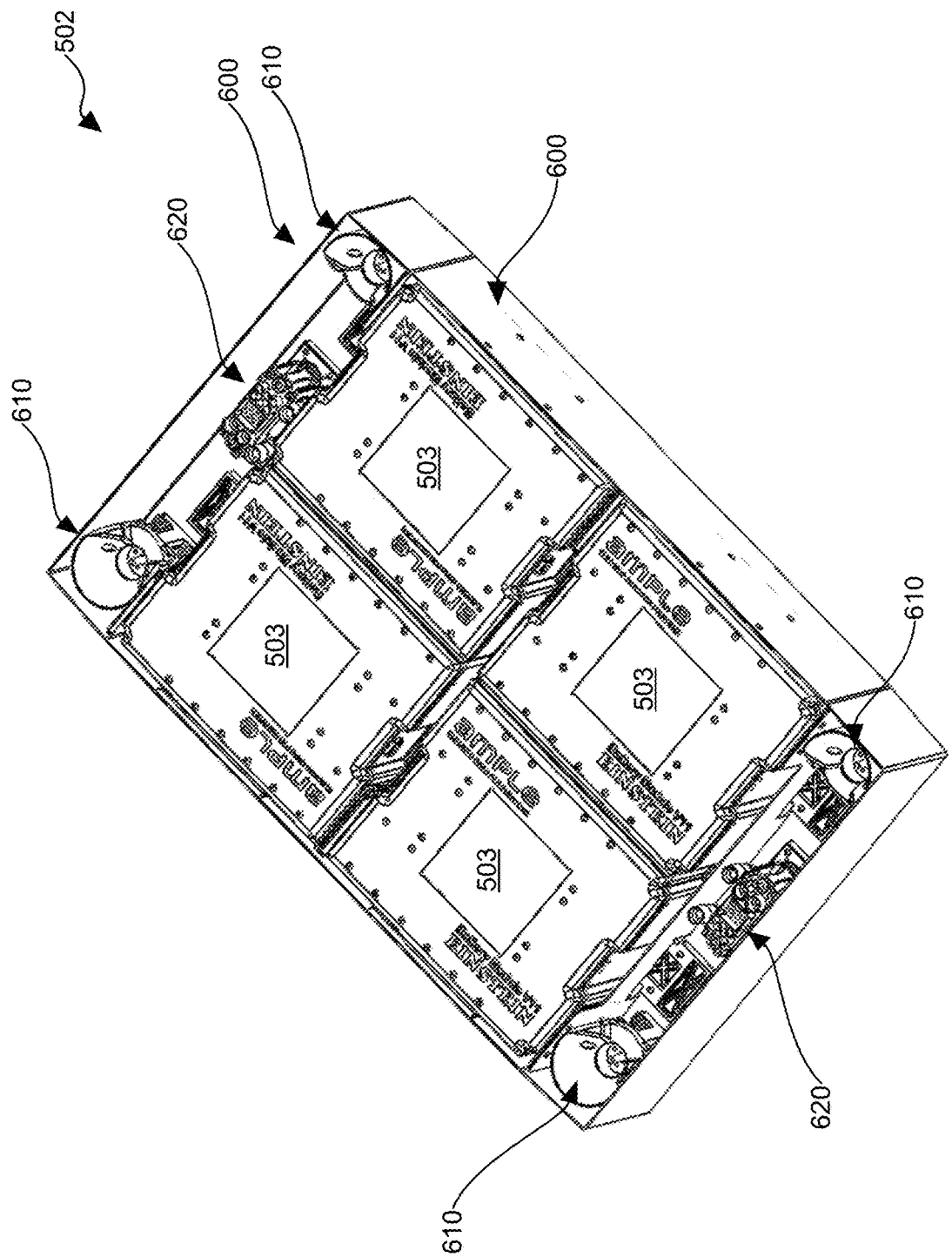
FIG. 6 is a perspective view of an example battery tray with removeable battery modules according to one or more embodiments.

FIG. 6 is a perspective view of an example battery tray 502 with battery modules 503 according to one or more embodiments. Battery tray 502 is configured to receive four battery modules 503, which are disposed on a planar tray surface of the battery tray 502. An outer tray wall 600 extends about the perimeter of the battery tray 502. Threaded attachment mechanisms 610 are disposed at the corners of the outer tray wall 600. The threaded attachment mechanisms 610 are configured to mate with complementary threaded attachment mechanisms that are disposed on the interface plate 501. For example, the threaded attachment mechanisms 610 can comprise bolts and the threaded attachment mechanisms disposed on the interface plate 501 can comprise nuts (or vice versa). In addition, battery tray 502 includes first and second tray electrical connectors 620A, 620B (in general, tray electrical connectors 620) that electrically couple the battery modules 503 to corresponding electrical connectors on the interface plate 501.

Figure 7:
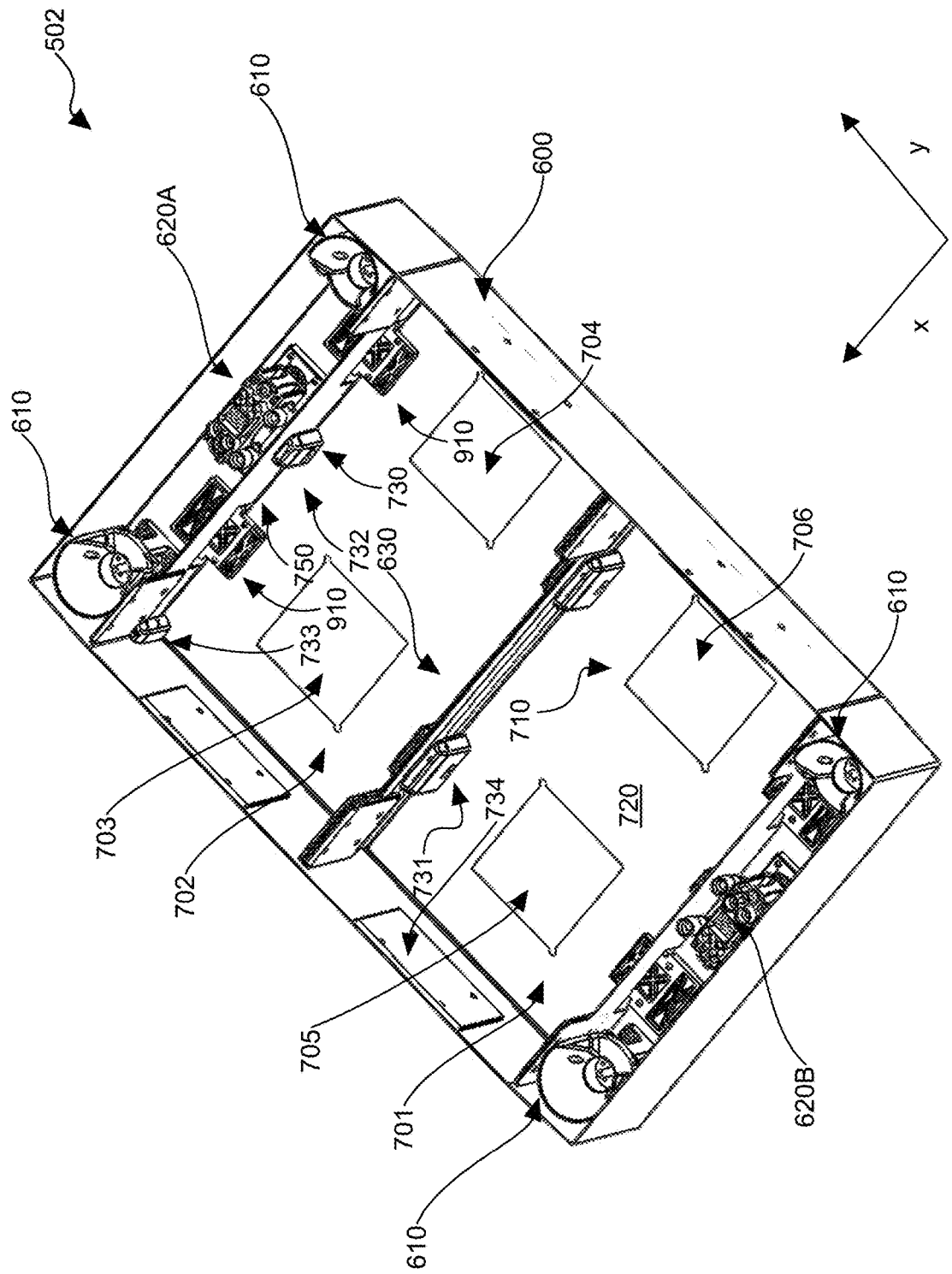
FIG. 7 is a perspective view of an example battery tray with the battery modules removed, according to one or more embodiments.

FIG. 7 is a perspective view of example battery tray 502 with the battery modules 503 removed, according to one or more embodiments. The battery tray 502 includes an inner wall 630 in the middle of the battery tray 502 that extends across the center of opposing outer tray walls 600 to define first and second battery tray sections 701, 702. Each battery tray section 701, 702 is configured to receive two battery modules 503. For example, battery tray section 701 is configured to receive first and second battery modules 503A, 503B (not illustrated) at first and second battery module positions 705, 706, respectively (generally one or more such connectors, depending on expected redundancy needs and/or power level requirements). Likewise, battery tray section 702 is configured to receive third and fourth battery modules 503C, 503D (not illustrated) at third and fourth battery module positions 703, 704, respectively. Visual identification markings 710 are disposed on planar tray surface 720 for a robot to identify the battery module positions 703-706 for placing each battery module 503.

Alignment pegs 730 further define the location to place each battery module 503 in orthogonal first and second directions (e.g., along the "x" and "y" axis of the battery tray 502) within a tolerance range (e.g., about 1 mm to about 2 mm). The alignment pegs 730 include a length alignment peg 731, a first corner alignment peg 732, a second corner alignment peg 733, and a width alignment peg 734. Each alignment peg 731-734 has a tapered upper portion 740.

FIG. 7 shows a tray that holds the batteries. FIG. 6 shows the tray with the batteries inserted into it. Example FIGS. 6, 7 show the tray from the top as it would normally be used in a road-going vehicle. The tray is inserted into the plate (FIG. 5 shows a view from under the plate) and locked in place. The tray of FIG. 7 may comprise a metal object that provides protection for the batteries therein.

Figure 8C:
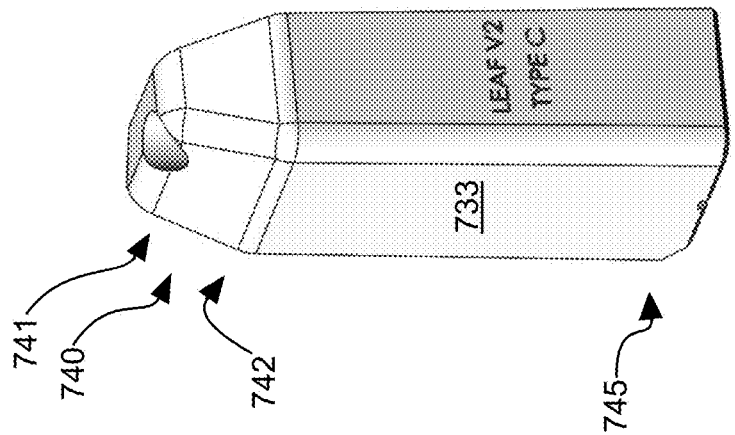
FIGS. 8A, 8B, and 8C illustrate a detailed view of the length alignment peg, first corner alignment peg, and second corner alignment peg, respectively, illustrated in FIG. 7, according to one or more embodiments.
Figure 8B:
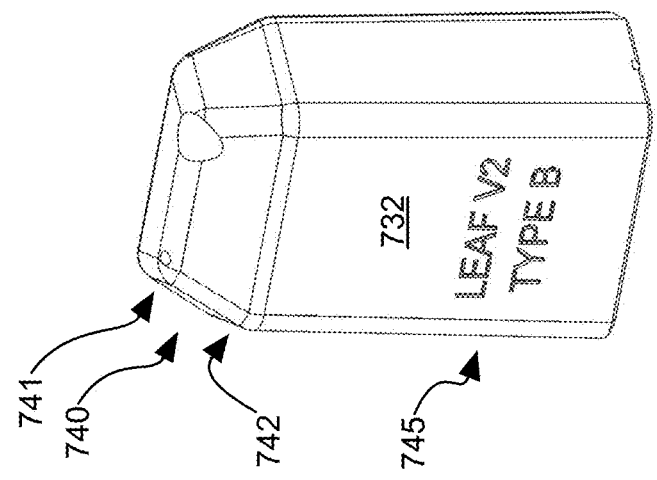
Figure 8A:
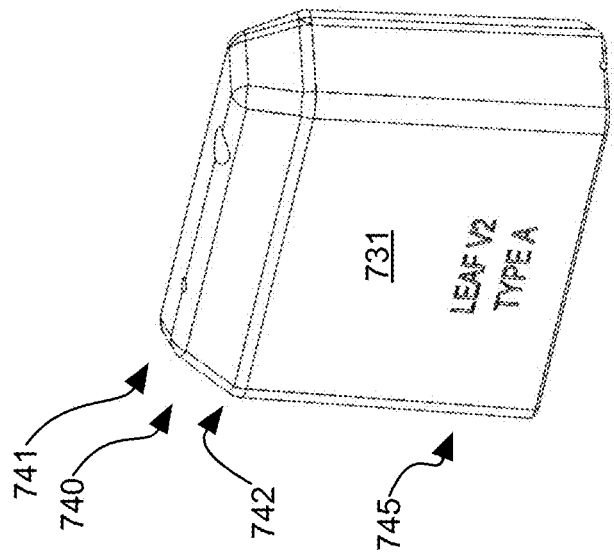

FIGS. 8A-C illustrate detailed views of the length alignment peg 731, first corner alignment peg 732, and second corner alignment peg 733, respectively, according to one or more embodiments. The cross-sectional thickness is smaller at the top 741 than at the bottom 742 of the tapered upper portion 740. In some embodiments, the cross-sectional thickness can increase by about 1 mm, about 1.5 mm, or about 2 mm (or any cross-sectional thickness or cross-sectional thickness range between any two of the foregoing values) or from the top 741 to the bottom 742 of the tapered upper portion 740. In a specific embodiment, the top 741 of the tapered upper portion 740 can have a cross-sectional thickness of about 3 mm, about 3.5 mm, or about 4 mm (or any cross-sectional thickness or cross-sectional thickness range between any two of the foregoing values) and the bottom 742 of the tapered upper portion 740 can have a cross-sectional thickness of about 5 mm, about 5.5 mm, or about 6 mm (or any cross-sectional thickness or cross-sectional thickness range between any two of the foregoing values).

The tapered upper portion 740 of each alignment peg 731-734 can help align a battery module 503, when placed by a robot, in the proper location (e.g., in one of battery module positions 703-706) on the tray surface 720. For example, in some embodiments the robot can place the battery module 503 in a target location on the tray surface 720 within about 1 mm to about 2 mm in orthogonal first and second directions (e.g., in the "x" and "y" directions of tray surface 720). The tapered upper portion 740 of the alignment pegs 731-734 can correct for any misalignment due to the robot's placement error.

The increased cross-sectional thickness of the lower portion 745 of each alignment peg 731-734 is designed so that it constrains movement of each battery module 503 in orthogonal first and second directions when the battery module 503 is disposed on the planar tray surface 720. Constraining movement can reduce vibration and the likelihood of damage to the battery modules 503 while the vehicle 110 is in motion. In a specific embodiment, the distance between each battery module 503 and its respective alignment pegs 731-734 is about 0.2 mm, about 0.25 mm, about 0.3 mm, about 0.35 mm, or about 0.4 mm when the battery module 503 is centered. As such, each battery module 503 can move a maximum of double this distance in orthogonal first and second directions when it moves between contacting alignment pegs 731-734 on opposing sides of the battery module 503.

Figure 9:
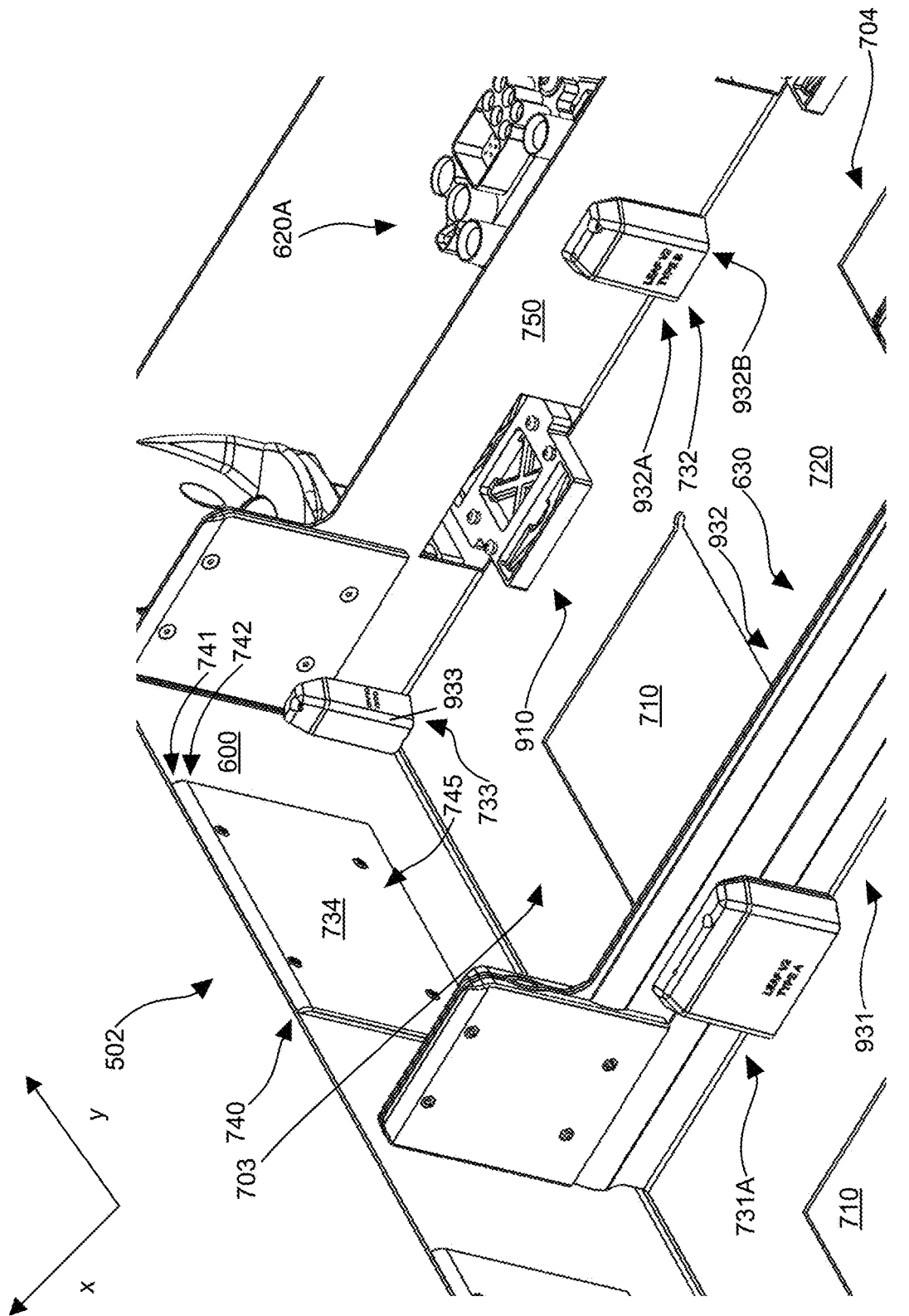
FIG. 9 is an enlarged perspective view of a portion of the example battery tray with the battery modules removed, according to one or more embodiments

FIG. 9 is an enlarged perspective view of a portion of example battery tray 502 with the battery modules 503 removed, according to one or more embodiments. This figure illustrates the location of each alignment peg 731-734 for a battery module. A first length alignment peg 731A is disposed proximal to (e.g., adjacent to, in contact with, and/or against) a first side 931 of inner wall 630 of battery tray 502. An identical second length alignment peg 731B (not illustrated) is disposed proximal to (e.g., adjacent to, in contact with, and/or against) a second side 932 of inner wall 630 of battery tray 502 and in alignment with the first length alignment peg 731. Each alignment peg 731 is aligned with the center of a respective visual identification marking 710.

The first corner alignment peg 732 is disposed, proximal to an outer wall 750, between first and second battery module positions 703, 704. A first planar corner 932A of the first corner alignment peg 732 is disposed to face a corner of the first battery module 503A when placed in the first battery module position 703. A second planar corner 932B of the first corner alignment peg 732 is disposed to face a corner of the second battery module 503B when placed in the second battery module position 704. The first and second planar corners 932A, 932B can align the first and second battery modules 503A, B in the "x" and "y" directions of tray surface 720 (generally one or more such modules and respective connectors).

The second corner alignment peg 733 is disposed, proximal to the outer wall 750, in a corner of first battery module position 703. A planar corner 933 of the second corner alignment peg 733 is disposed to face a corner of the first battery module 503A when placed in the first battery module position 703. The planar corner 933 can align the first battery module 503A in the "x" and "y" directions of tray surface 720. Accordingly, the first and second corner alignment pegs 732, 733 are configured and arranged to align two corners of the first battery module 503A in the "x" and "y" directions and to constrain the first battery module 503A with respect to the "x" and "y" directions.

The width alignment peg 734 is disposed on the outer tray wall 600 and centered along the length of first batter module 503A when placed in the first battery module position 703. The width alignment peg 734 can align the first battery modules 503A in the "x" direction of tray surface 720 and can constrain the first battery module 503A with respect to the "x" direction.

FIG. 9 also illustrates a battery module connector 910 having an input that is configured to be releasably electrically coupled to a battery module 503 when the battery module 503 is in the first battery module position 703. The battery module connectors 910 for the first and second battery module positions 703, 704 have output connectors that are electrically coupled to the first tray electrical connector 620A. Likewise, the battery modules connectors 910 for the third and fourth battery module positions 705, 706 have outputs that are electrically coupled to the second tray electrical connector 620B.

Though the foregoing description has focused on the alignment pegs 731-734 and battery module connector 910 for the first battery module position 703, it is noted that identical alignment pegs 731-734 and battery module connectors 910 are provided in the battery tray 502 for each battery module position 703-706.

When the battery tray 502 is not attached to the interface plate 501, the battery modules 503 can be removed from the battery tray 502. For example, the battery modules 503 can be removed (e.g., by a robot or manually) to place them in a charging apparatus. Alternatively, the battery tray 502 can be electrically connected to a power source to charge the battery modules 503. A battery module 503 can also be removed from the battery tray 502 when the battery module 503 is damaged or it is at or near its end of life. In another embodiment, when the battery modules 503 are depleted, they can be removed and replaced with charged battery modules. Each battery module 503 can be removed by lifting it vertically away from the tray surface 720, which disconnects the battery module output connectors from the battery module connector 910.

Figure 10:
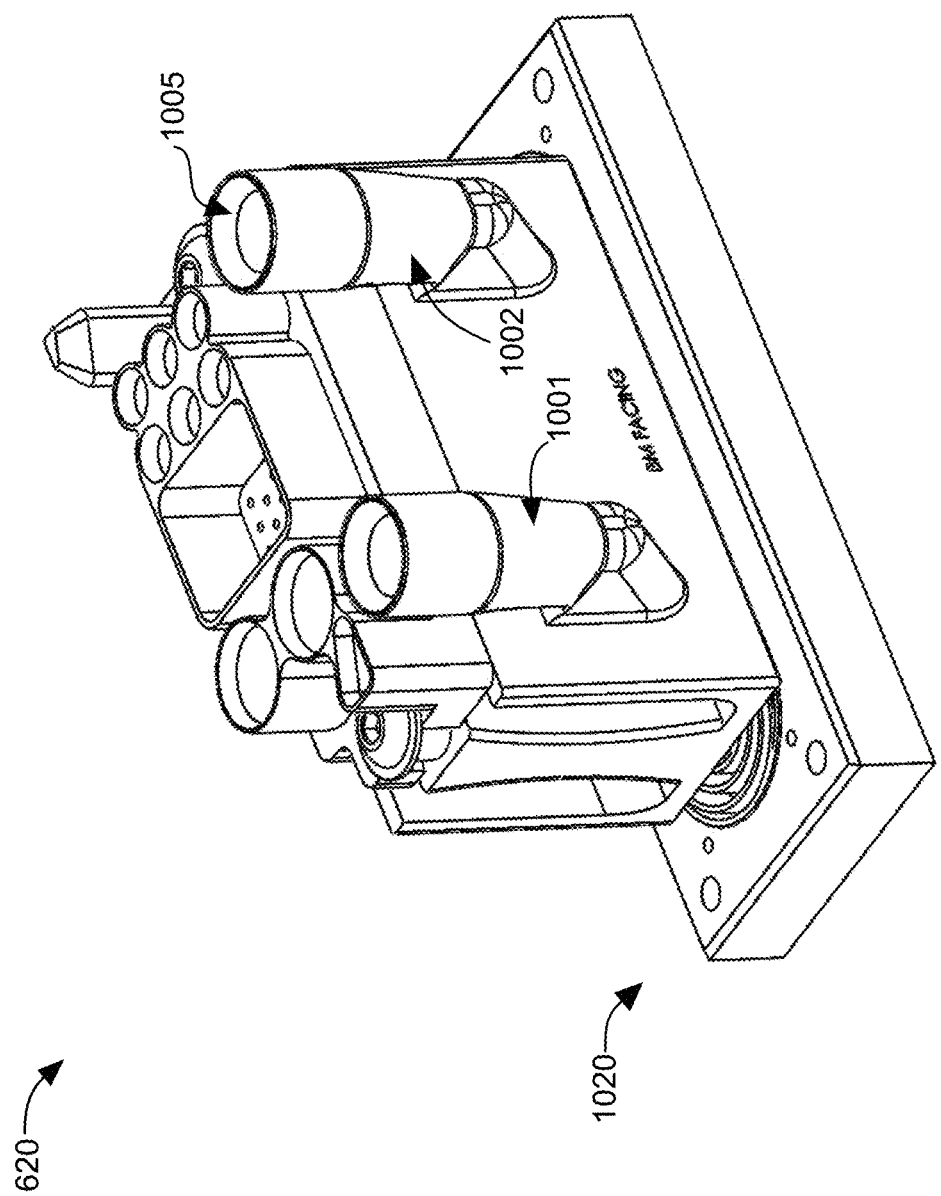
FIG. 10 is a detailed view of a tray electrical connector, according to one or more embodiments.

FIG. 10 is a detailed view of the tray electrical connector 620, according to one or more embodiments. The tray electrical connector 620 includes first and second female electrical connectors 1001, 1002 that are configured to mate with corresponding first and second male electrical connectors in the interface plate 501. The exposed end of each female electrical connector 1001, 1002 includes a tapered portion 1005 that tapers from a wide diameter to a narrow diameter (e.g., that tapers from about 3 mm to about 2 mm), which can help align the male electrical connectors to the respective female electrical connectors 1001, 1002.

Figure 11:
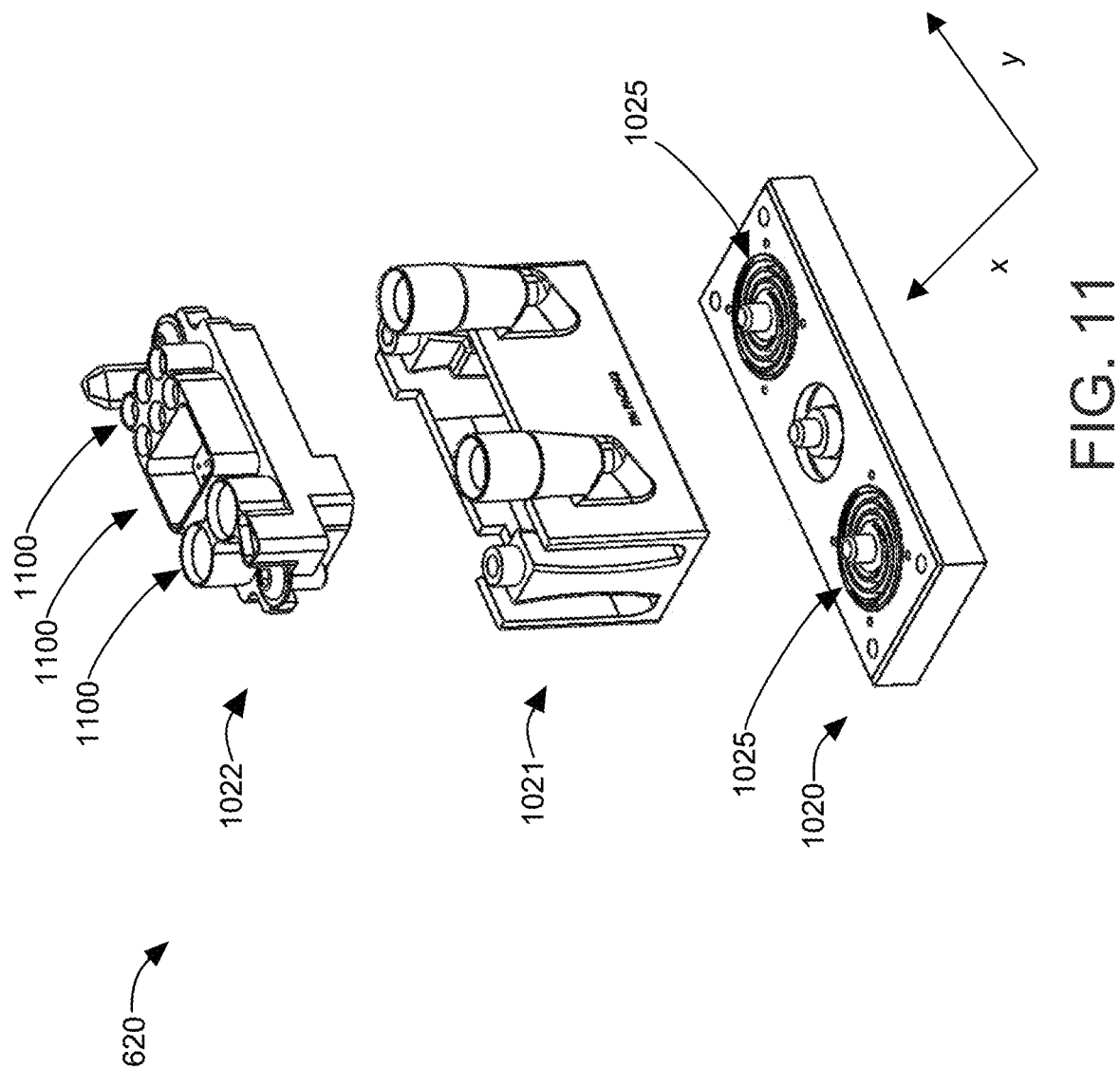
FIG. 11 is an exploded perspective view of the tray electrical connector illustrated in FIG. 10, according to one or more embodiments.

The tray electrical connector 620 includes a base 1020 that includes first and second springs 1025, as illustrated in FIG. 11. The springs 1025 allow the middle and top portions 1021, 1022 to move laterally (e.g., orthogonal to the height of tray electrical connector 620 in the "x" and/or "y" directions) up to about 4.5 mm, about 5 mm, about 5.5 mm, or any value or range between any two of the foregoing.

Figure 12:
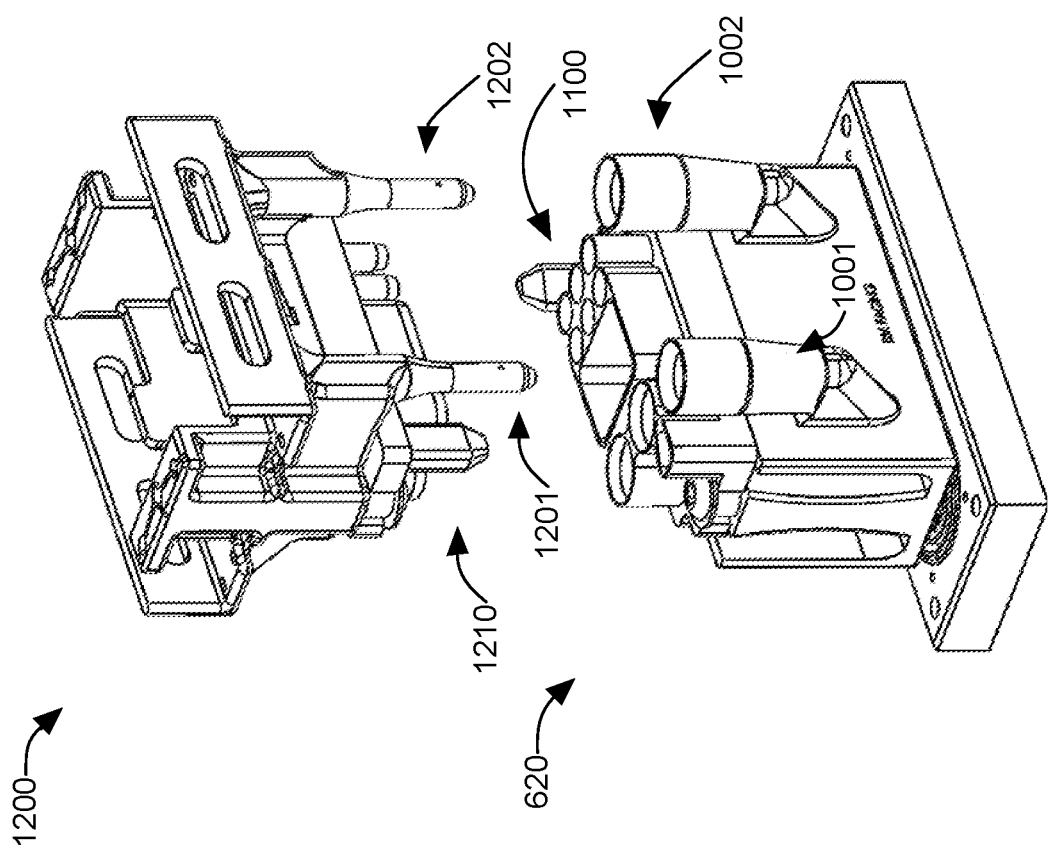
FIG. 12 illustrates a perspective view of an interface connector and the tray electrical connector, according to one or more embodiments.

The top portion 1021 includes orifices 1100 that are configured to mate with corresponding mechanical projections 1210 that are mechanically coupled to the first and second male electrical connectors 1201, 1202 of interface connector 1200, as illustrated in FIG. 12.

Figure 13:
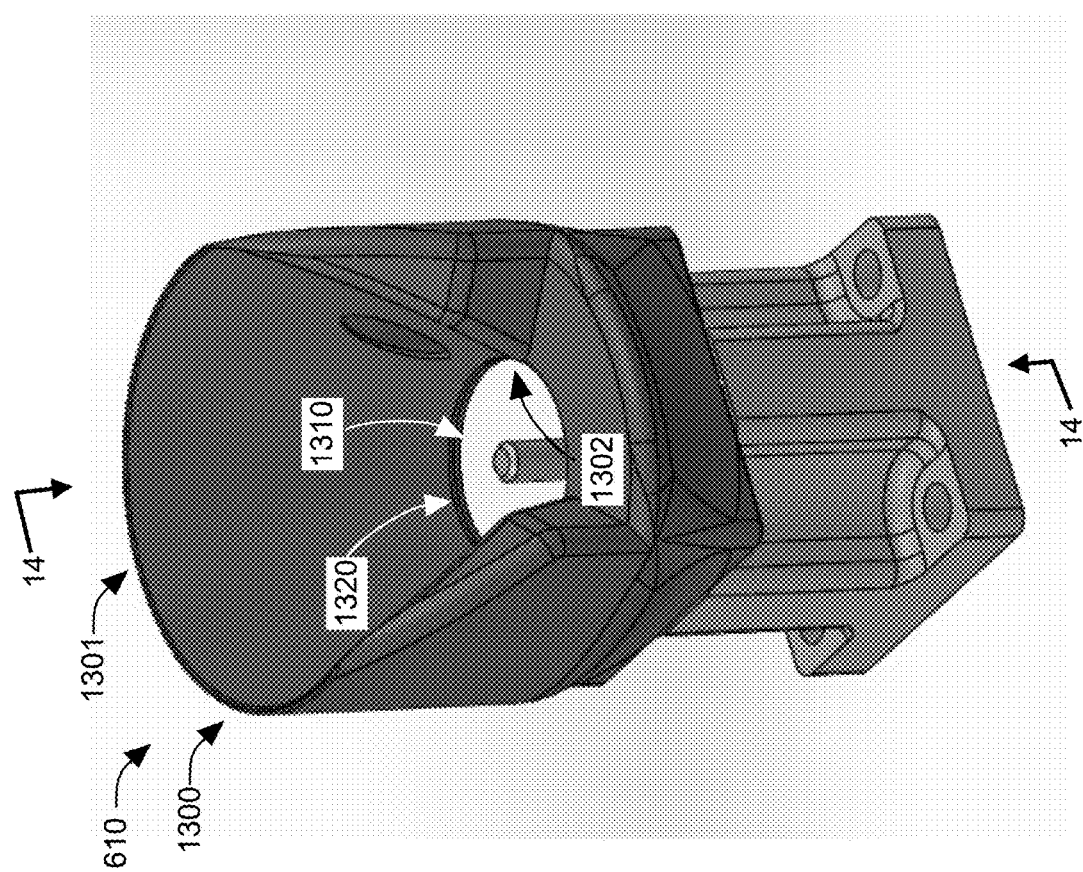
FIG. 13 is a detailed view of a threaded attachment mechanism, according to one or more embodiments.
Figure 14:
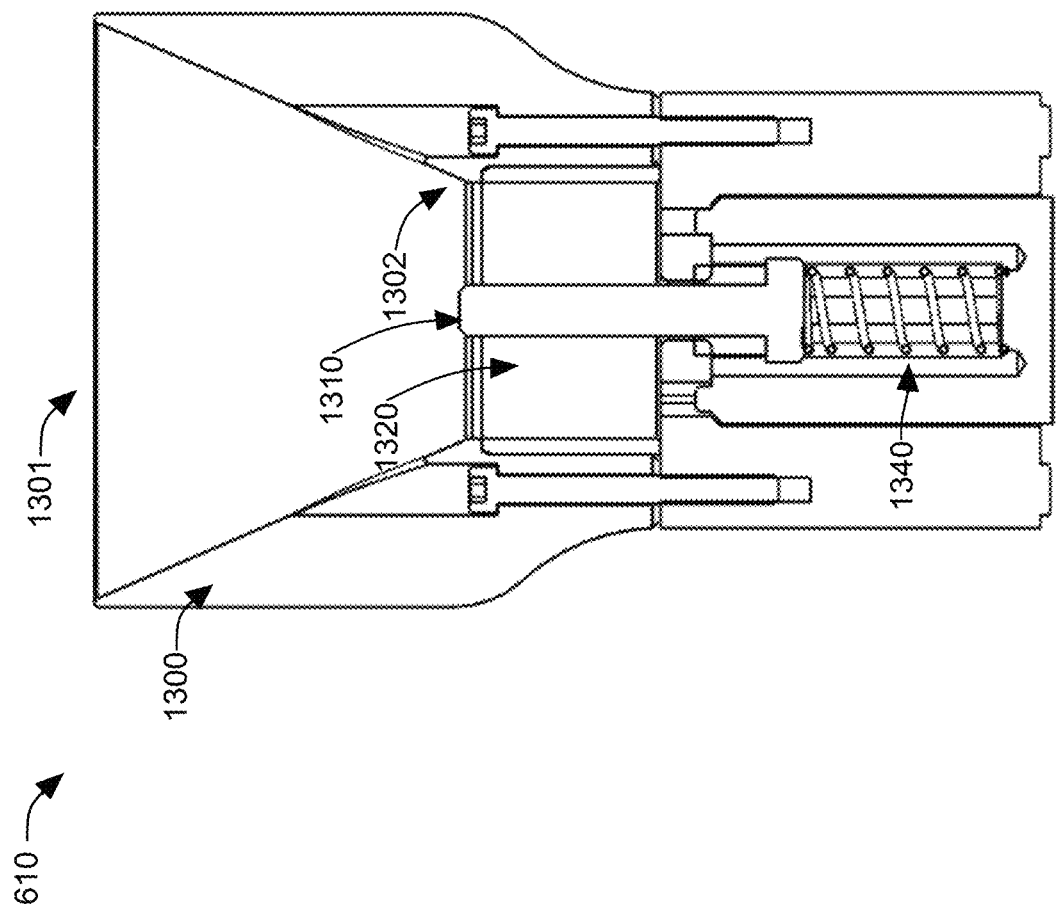
FIG. 14 is a cross-sectional view of the threaded attachment mechanism illustrated in FIG. 13, according to one or more embodiments.

FIG. 13 is a detailed view of threaded attachment mechanism 610, which is disposed at each corner of the outer tray wall 600. The threaded attachment mechanism 610 includes a tapered cylindrical top 1300 that tapers from a wide diameter at the top 1301 to a narrow diameter at the bottom 1302. A threaded bolt 1310 is disposed in a cylindrical cavity 1320 that extends from the bottom 1302 of the tapered cylindrical top 1300. The threaded bolt 1310 is mounted on a spring 1340, as illustrated in FIG. 14, which is a cross-sectional view of threaded attachment mechanism 610 through plane 14-14 in FIG. 13. The threaded bolt 1310 engages a threaded nut disposed in a corresponding threaded attachment mechanism on the interface plate 501 (or vice versa). The tapered cylindrical top 1300 provides a self-aligning feature when the threaded nut is placed into the threaded attachment mechanism 610 to engage the threaded bolt 1310. Additional details of the threaded attachment mechanisms are disclosed in U.S. Patent Application Publication No. 2016/0369826, titled "Automated Self-Aligning Mechanical Fastener," published on Dec. 22, 2016, which is hereby incorporated by reference.

Figure 15:
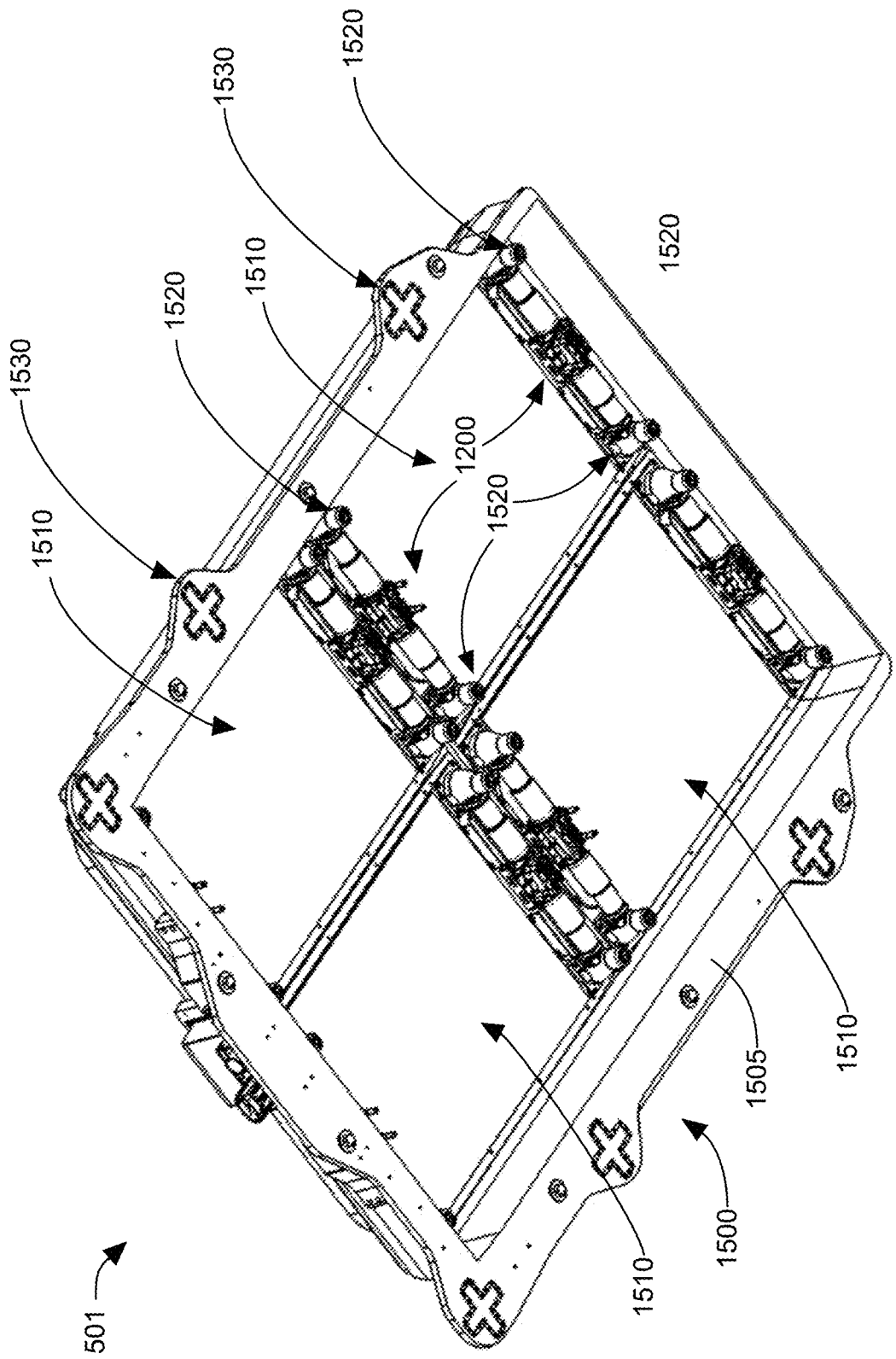
FIG. 15 is a perspective view of the bottom of the interface plate illustrated in FIG. 5, according to one or more embodiments.

FIG. 15 is a perspective view of the bottom 1500 of the interface plate 501, according to one or more embodiments. The interface plate 501 includes four compartments 1510 to receive four respective battery trays 502. Each compartment 1510 includes threaded attachment mechanisms 1520 in its corners that are aligned with and configured to mate with complementary threaded attachment mechanisms 610 on the battery trays 502. As discussed above, the threaded attachment mechanisms 610 on the battery trays 502 can comprise bolts and the threaded attachment mechanisms 1520 on the interface plate 501 can comprise nuts (or vice versa). In addition, each compartment 1510 includes two interface connectors 1200 that includes first and second male electrical connectors 1201, 1202.

The interface plate 501 also includes a flange 1505 disposed around the four compartments 1510. Fiducial or position indicating marks 1530 are disposed on the flange 1505 so they are visible when the battery trays 502 are disposed in the compartments 1510. The fiducial or position indicating marks 1530 can be the same as fiducial or position indicating marks 330.

Figure 16:
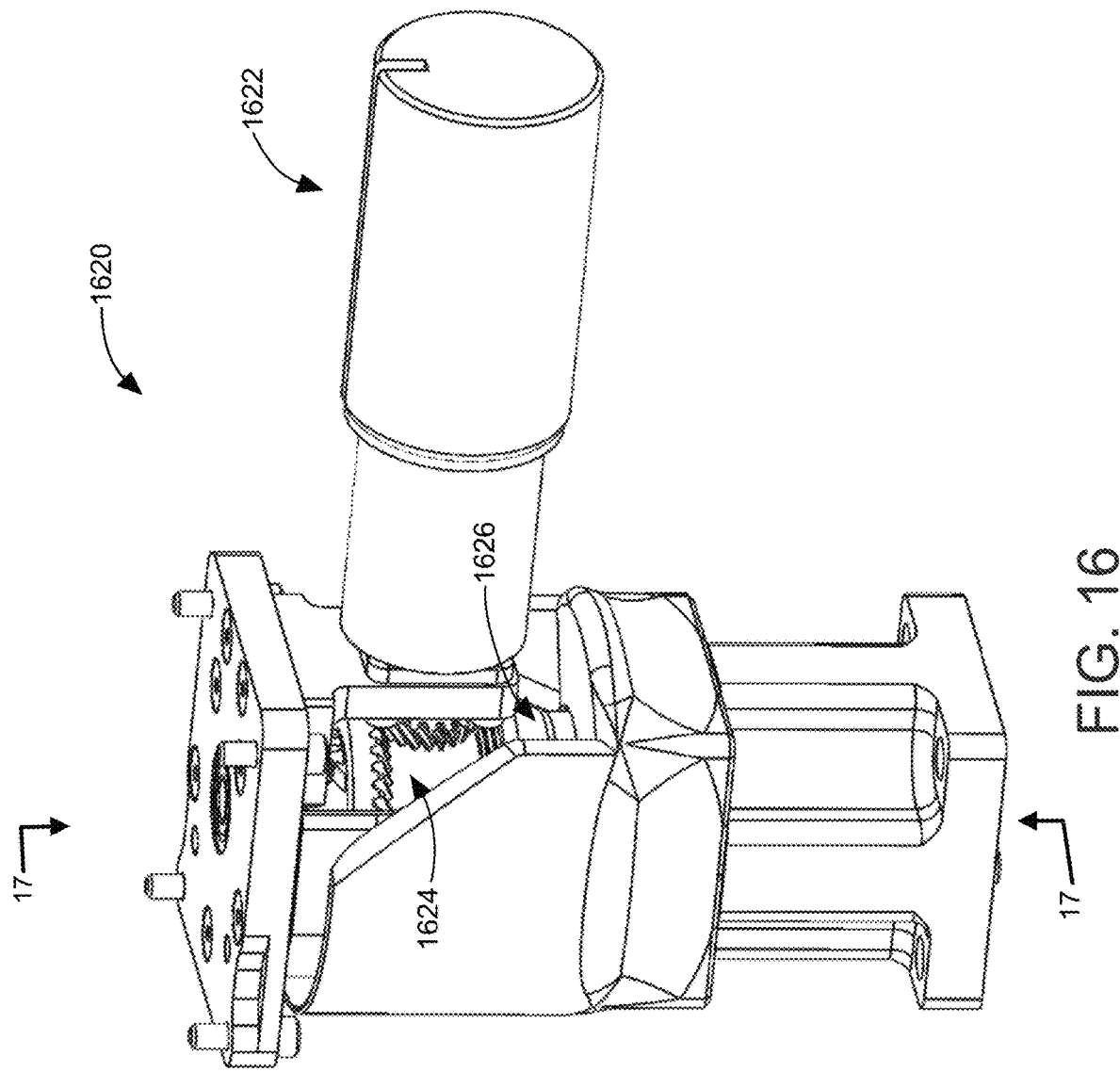
FIG. 16 is a perspective view of an example threaded attachment mechanism, according to one or more embodiments.

FIG. 16 is a perspective view of an example threaded attachment mechanism 1620, which can be the same as or different than each threaded attachment mechanism 1520. The threaded attachment mechanism 1620 includes a motor 1622 and a gear system 1624 that drives a nut 1626 to engage a corresponding bolt on the battery tray 502. Alternatively, the motor 1622 and gear system 1624 can drive a bolt that engages a corresponding nut on the battery tray 502.

Figure 17:
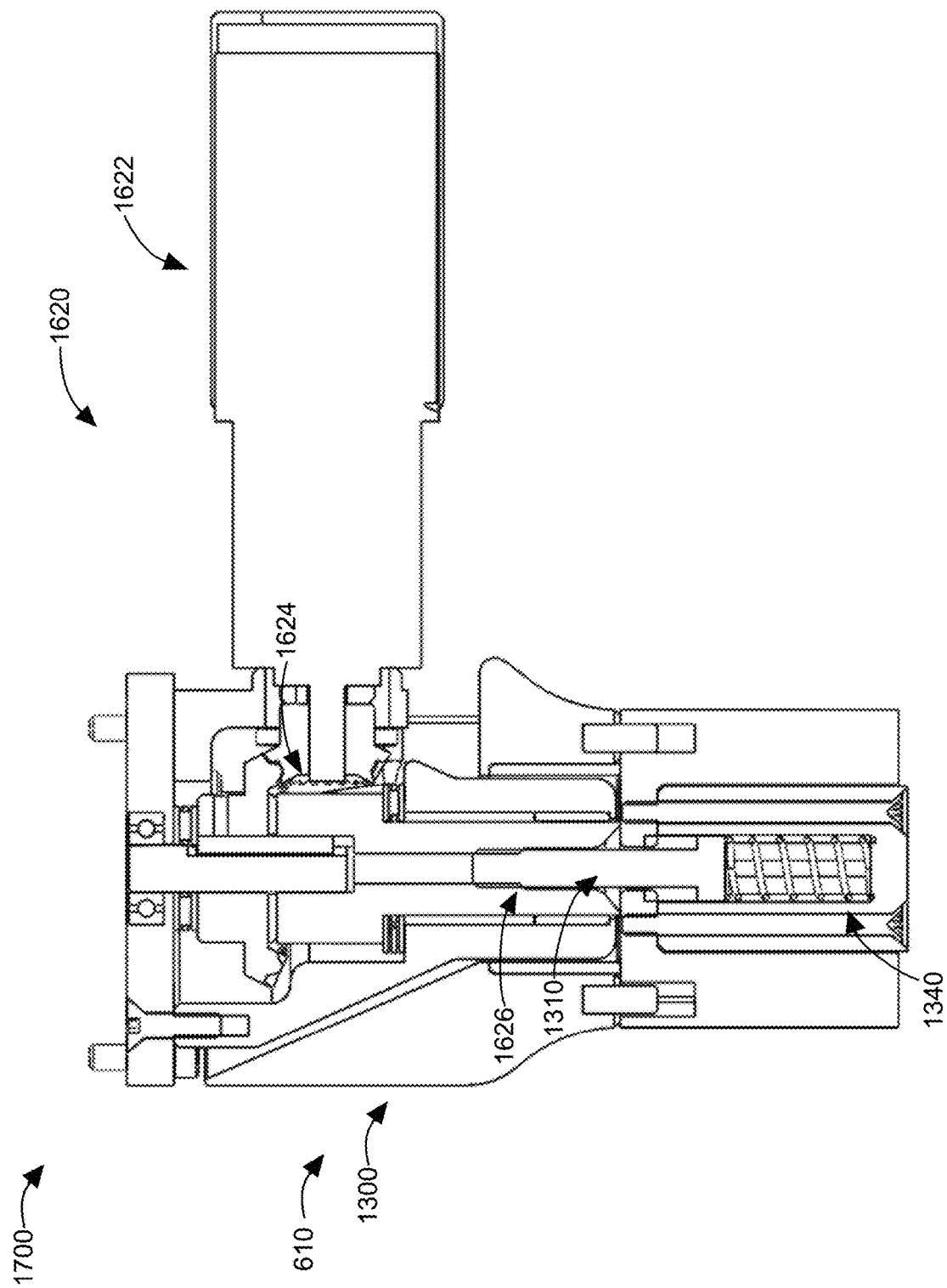
FIG. 17 is a cross-sectional view of a threaded attachment assembly that includes one or more threaded attachment mechanisms, according to one or more embodiments.

FIG. 17 is a cross-sectional view of a threaded attachment assembly 1700 that includes the threaded attachment mechanisms 610, 1620, according to one or more embodiments. Threaded attachment assembly 1700 can be the same as or can comprise threaded attachment mechanism 1620. For example, the cross-sectional view of assembly 1700 can be through plane 17-17 in FIG. 16. The threaded attachment mechanism 1620 on the interface plate 501 is engaged with the threaded attachment mechanism 610 on the battery tray 502. Specifically, the motor 1622 has driven the gear system 1624 to rotate the nut 1626 onto the threaded bolt 1310 in the threaded attachment mechanism 1620 on the battery tray 602. Rotating the nut 1626 onto the threaded bolt 1310 secures the threaded attachment mechanisms 610, 1620 together, which in turn, in combination with other threaded attachment mechanisms 610, 1620, secures the battery tray 502 to the interface plate 501.

Figure 18:
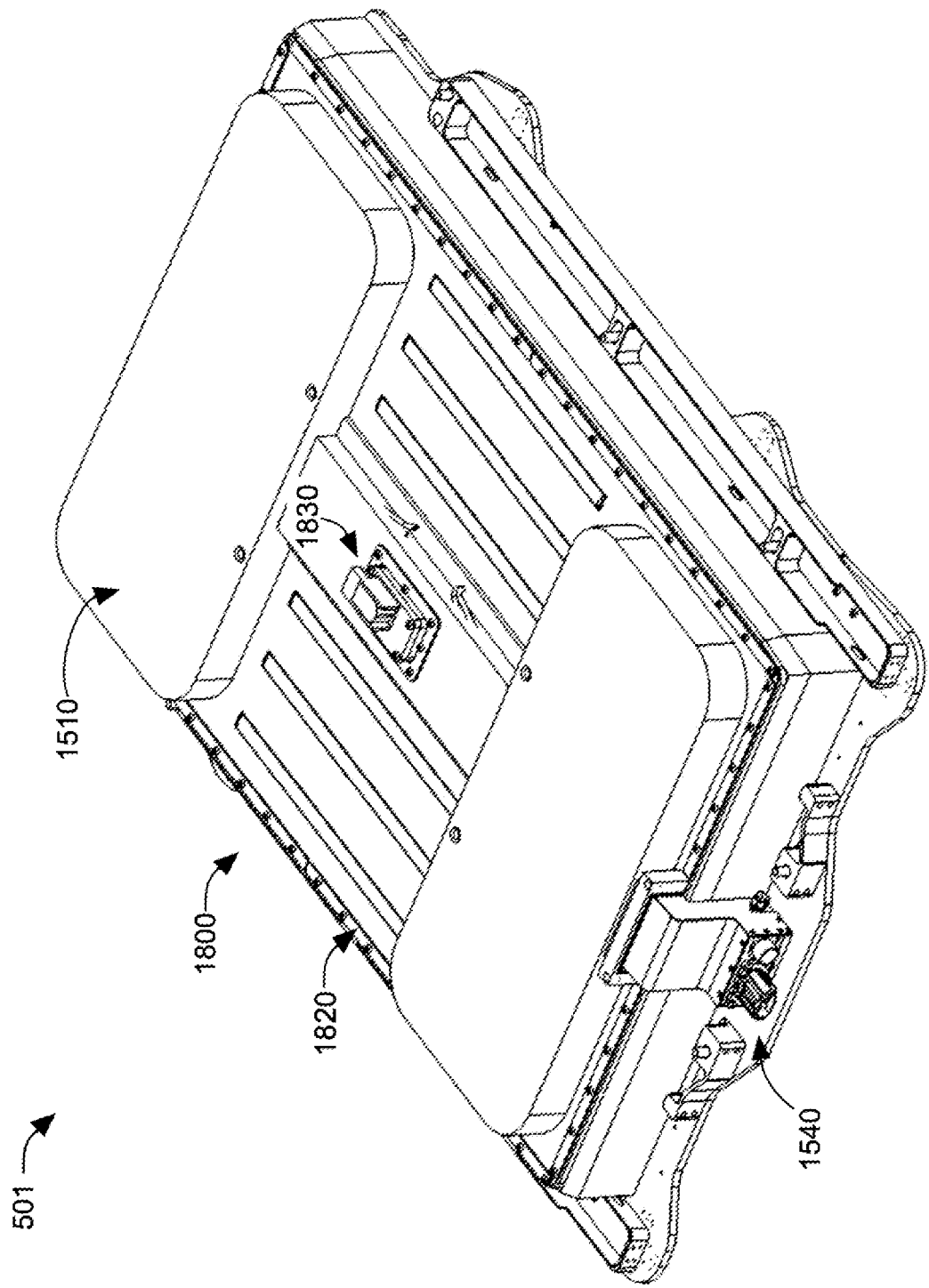
FIG. 18 is a perspective view of the top side of the interface plate, according to one or more embodiments.

FIG. 18 is a perspective view of the top side 1800 of the interface plate 501, according to one or more embodiments. In operation, the top side 1800 of the interface plate 501 is secured against the underside of vehicle 110 (e.g., by bolts, nuts, or other attachment mechanism). A cover 1510 extends across the top side 1800 of the interface plate 501 to physically protect the underlying electrical structures. The interface cover 1510 is disposed on a gasket 1820 to provide a waterproof barrier to protect the underlying electrical structures. The gasket 1820 can comprise neoprene, rubber, silicone, polychlorotrifluoroethylene, or another material.

An emergency disconnect switch 1830 is disposed in a hole defined in the interface cover 1510. The emergency disconnect switch 1830 is configured to cut electrical power from flowing from the battery modules 503 to the interface output connector 1540, which is electrically coupled to the vehicle 110 when the interface plate 501 is secured to the underside of vehicle 110.

Figure 19:
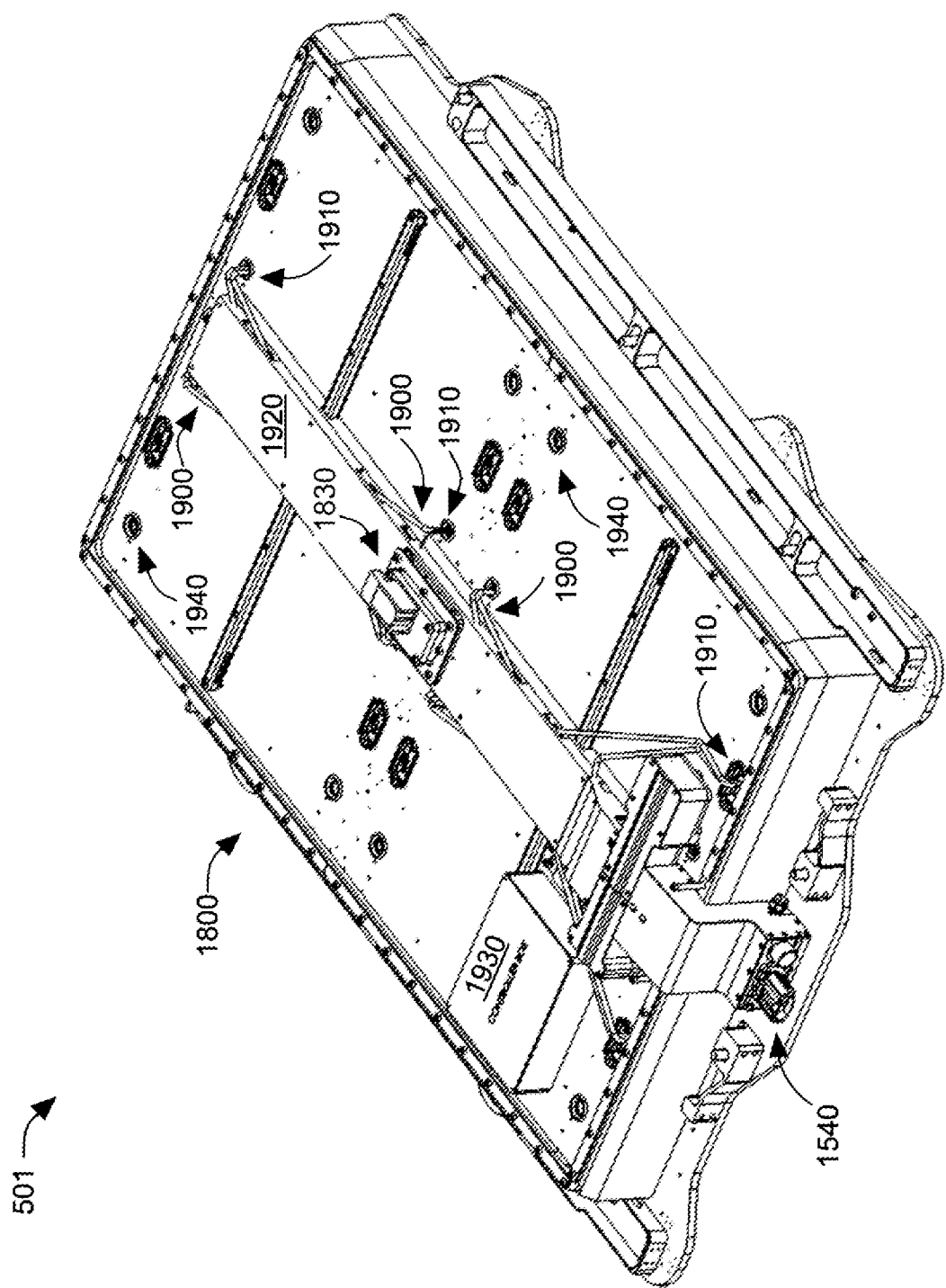
FIG. 19 is a perspective view of the top side of the interface plate without the interface cover, according to one or more embodiments.

FIG. 19 is a perspective view of the top side 1800 of the interface plate 501 without the interface cover 1510, according to one or more embodiments. This view illustrates that electrical wires 1900 pass through holes 1910 in the interface plate 501 to electrically connect to the interface connectors 1200 (e.g., to the first and second male electrical connectors 1201, 1202 on the interface connector 1200). Each set of electrical wires 1900 includes a first wire that connects to the first male electrical connector 1201 (e.g., that carries a positive electrical current) and a second wire that connects to the second male electrical connector 1202 (e.g., that carries a negative electrical current). Each electrical wire 1900 is electrically connected to a conductive bus bar 2000 (FIGS. 20, 21), disposed under bus bar cover 1920, that is electrically connected to the interface output connector 1540.

The top side 1800 of the interface plate 501 also includes a controller box 1930 that houses controller circuitry including microprocessors and memory that includes instructions readable or executable by the microprocessors. In addition, the top side 1800 of the interface plate 501 includes attachment holes 1940 for securing the interface plate 501 to the underside of the vehicle 110.

Figure 20:
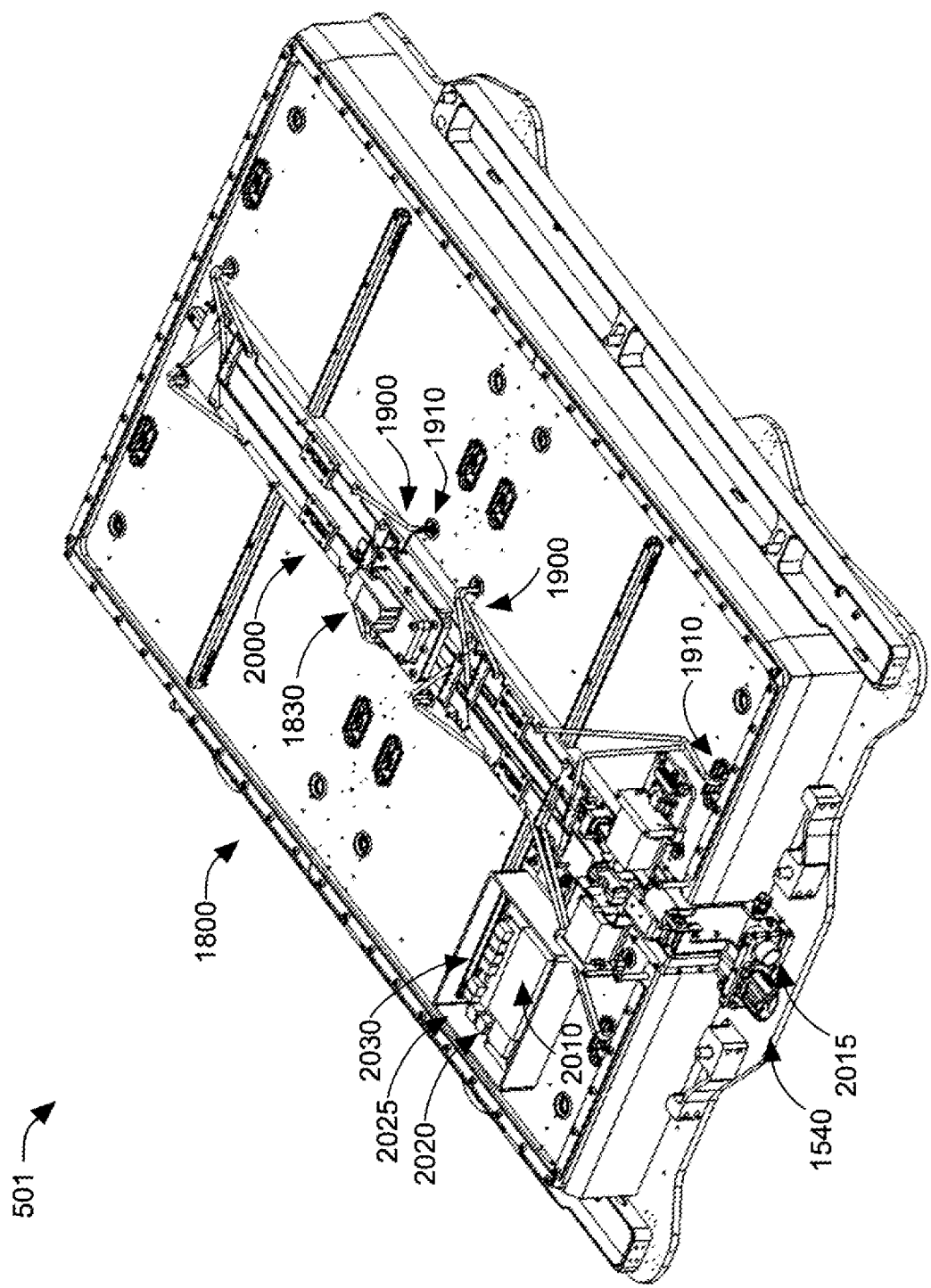
FIG. 20 is a perspective view of the top side of the interface plate without the interface cover, the cover for the controller box, and the bus bar cover, according to one or more embodiments.

FIG. 20 is a perspective view of the top side 1800 of the interface plate 501 without the interface cover 1510, the cover for the controller box 1930, and the bus bar cover 1920, according to one or more embodiments. As illustrated, the controller box 1930 includes first, second and third microprocessors 2010, 2020, 2025, and memory modules 2030. The memory modules 2030 store instructions (e.g., software) that are readable and/or executable by the first, second and third microprocessors 2010, 2020, 2025.

The first microprocessor 2010 can electrically communicate with a control system of the vehicle 110 via interface plate signal output connector 2015, which is electrically coupled to the first microprocessor 2010. The first microprocessor 2010 can send data to the control system of the vehicle 110 such as specifications of the battery modules 503, the remaining energy in the battery modules 503, and other data relating to the battery storage compartment 500.

The second microprocessor(s) 2020 is/are in electrical communication with the motors 1622 in each threaded attachment mechanism 1620 on the interface plate 501. The second microprocessor(s) 2020 send commands to each motor 1622 to engage or disengage the corresponding threaded attachment mechanism 610 on the battery tray 502.

The second microprocessor(s) 2020 can be in electrical communication directly or indirectly with an external robot (e.g., lift robot 20, battery exchange robot 120, and/or mobile operations platform 130) and/or an external control system to determine when to send the appropriate commands. In some embodiments, the second microprocessor(s) 2020 is/are in electrical communication with the first microprocessor 2010, which in turn is in communication directly or indirectly with an external robot (e.g., lift robot 20, battery exchange robot 120, and/or mobile operations platform 130) and/or an external control system.

The third microprocessor(s) 2025 is/are in electrical communication with the fiducial or position-indicating marks 1530 to control lights (e.g., light-emitting diodes) on the fiducial or position-indicating marks 1530. For example, the third microprocessor(s) 2025 can control the light frequency of each fiducial or position-indicating mark 1530, the duration and/or frequency that each fiducial or position-indicating marks 1530 is turned on, and/or a sequence or pattern of turning on/off the fiducial or position-indicating marks 1530.

Figure 21:
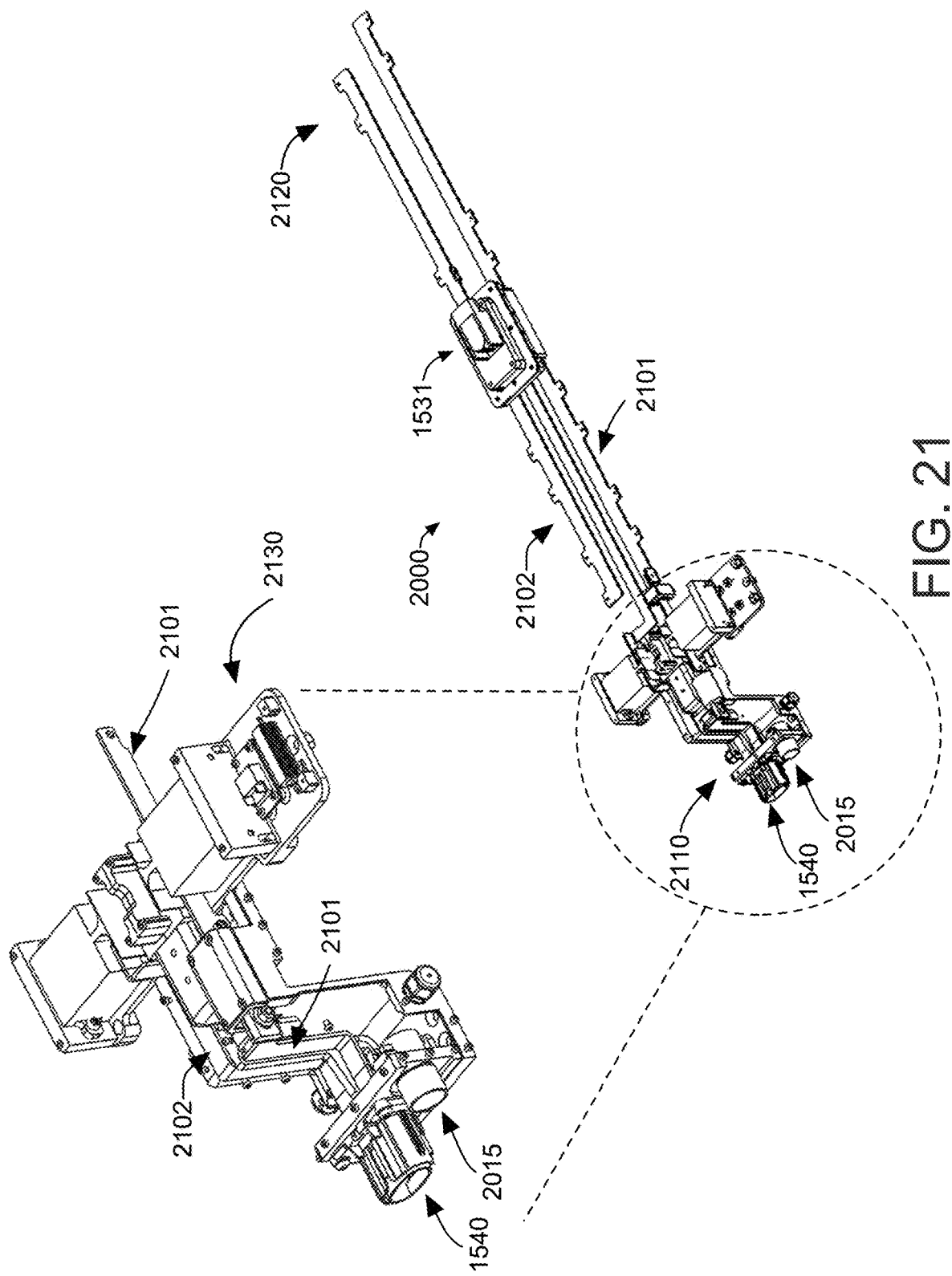
FIG. 21 is a perspective view of a conductive bus bar according to one or more embodiments.

FIG. 21 is a perspective view of conductive bus bar 2000 according to one or more embodiments. The conductive bus bar 2000 includes first and second conductive bars 2101, 2102 that each extend to first and second ends 2110, 2120 of the conductive bus bar 2000. At the first end 2110, the first and second conductive bars 2101, 2102 are physically and electrically coupled to the interface output connector 1540. The conductive bus bar 2000 can be formed of copper, aluminum, silver, or another conductive material. Service disconnect 1531 permits disconnecting voltage in the system when the plate is being serviced. In some embodiments, the conductive material (e.g., copper) is coated with nickel or another anti-corrosion material to prevent corrosion. Portions of the bus bar 2000 can be coated with an insulating material, such as epoxy powder or another insulating material. In some embodiments, all surfaces of the conductive bus bar 2000 are coated with the insulating material except for the locations in physical and electrical contact with the electrical wires 1900 and the terminals at interface output connector 1540.

The first conductive bar 2101 can be electrically coupled to a fuse circuit 2130 that will cut off electrical power to the vehicle 120 (e.g., via interface output connector 1540) when the current passing through the first conductive bar 2101 exceeds a predetermined maximum current.

The invention should not be considered limited to the particular embodiments described above, but rather should be understood to cover all aspects of the invention as fairly set out in the attached claims. Various modifications, equivalent processes, as well as numerous structures to which the invention may be applicable, will be apparent to those skilled in the art to which the invention is directed upon review of this disclosure. The claims are intended to cover such modifications and equivalents.

What is claimed is:

1. An apparatus for electrically and mechanically coupling removeable battery modules to a vehicle, comprising:
   an interface plate configured to be mechanically coupled to the vehicle, the interface plate comprising:
      an interface plate electrical output that electrically couples the interface plate to the vehicle; and
      an interface plate electrical input electrically coupled to the interface plate electrical output; and
   battery trays that releasably receive the removeable battery modules, each battery tray releasably mechanically coupled to the interface plate and comprising:

at least one battery module connector releasably electrically coupled to corresponding at least one battery module; and
a battery tray electrical output that electrically couples the at least one battery module connector to the interface plate electrical input;
wherein the interface plate and each battery tray include complementary threaded fasteners that releasably mechanically couple the battery tray and the interface plate.

2. The apparatus of claim 1, wherein:
the interface plate further includes:
first mechanical threaded fasteners;
motors, each motor in mechanical communication with a corresponding first threaded fastener; and
a controller in electrical communication with the motors, and
each battery tray further includes second threaded fasteners, each second threaded fastener aligned with a corresponding first threaded fastener,
wherein the controller sends a first signal to each motor that causes a corresponding first threaded fastener to mechanically engage the second threaded fastener, and the controller sends a second signal to each motor that causes the corresponding first threaded fastener to mechanically disengage from the respective second threaded fastener.

3. The apparatus of claim 2, wherein the interface plate includes a microprocessor in electrical communication with each motor to control whether the corresponding first mechanical threaded fastener engages or disengages from the respective second threaded fastener.

4. The apparatus of claim 2, wherein the interface plate further includes gear systems, each gear system mechanically translating a rotation of a respective motor to a rotation of a respective first mechanical connector.

5. The apparatus of claim 2, wherein the first mechanical connector comprises a nut and the second mechanical connector comprises a bolt.

6. The apparatus of claim 1, wherein each battery tray includes alignment pegs that define at least one battery module position to receive the corresponding at least one battery module on the battery tray.

7. The apparatus of claim 6, wherein each alignment peg extends from a first end to a second end, the first end disposed on the battery tray, the second end tapering from a first thickness equal to a thickness of the first end to a second thickness that is less than the first thickness.

8. The apparatus of claim 7, wherein the thickness of the first end is configured to reduce a lateral movement of the respective battery module.

9. The apparatus of claim 1, wherein the battery tray electrical output electrically couples outputs of adjacent at least one battery module to the interface plate electrical input.

10. The apparatus of claim 1, wherein the interface plate electrical input is electrically coupled to a conductive bus bar or conductive wire that extends to the interface plate electrical output.

11. An apparatus for electrically and mechanically coupling removeable battery modules to a vehicle, comprising:
an interface plate configured to be mechanically coupled to the vehicle, the interface plate comprising:
an interface plate electrical output that electrically couples the interface plate to the vehicle; and
an interface plate electrical input electrically coupled to the interface plate electrical output; and
battery trays that releasably receive the removeable battery modules, each battery tray releasably mechanically coupled to the interface plate and comprising:
at least one battery module connector releasably electrically coupled to corresponding at least one battery module; and
a battery tray electrical output that electrically couples the at least one battery module connector to the interface plate electrical input;
wherein the interface plate includes a flange that comprises position-indicating marks, the positioning-indicating marks comprising light-emitting diodes (LED), light reflecting material, or machine-detectable markings.

12. The apparatus of claim 11, wherein the interface plate includes a microprocessor in electrical communication with the position-indicating marks to control the light-emitting diodes, light reflecting material, or machine-detectable markings.

13. An interface plate configured to be mechanically coupled to a vehicle, the interface plate comprising:
an electrical output that electrically and mechanically couples the interface plate to the vehicle;
an electrical input that includes first electrical connectors that are configured to mate with complementary electrical connectors in removeable battery trays configured and arranged to hold a plurality of replaceable battery modules;
a conductive bus bar or conductive wire that electrically couples the electrical input to the electrical output;
a flange; and
position-indicating marks comprising controllable light-emitting diodes, the positioning-indicating marks disposed on the flange.

14. The interface plate of claim 13, further comprising a microprocessor in electrical communication with the position-indicating marks to control the light-emitting diodes.

15. The interface plate of claim 13, wherein the interface plate and each battery tray include complementary threaded fasteners that releasably mechanically couple the battery tray and the interface plate.

16. The interface plate of claim 13, wherein:
the interface plate further includes:
first mechanical threaded fasteners;
motors, each motor in mechanical communication with a corresponding first threaded fastener; and
a controller in electrical communication with the motors;
wherein the controller sends a first signal to each motor.

17. The interface plate of claim 16, wherein the interface plate includes a microprocessor in electrical communication with each motor.

18. The apparatus of claim 16, wherein the interface plate further includes gear systems, each gear system mechanically translating a rotation of a respective motor to a rotation of a respective first mechanical connector.

19. The apparatus of claim 16, wherein the first mechanical connector comprises a nut.

20. The interface plate of claim 13, wherein:
the interface plate further includes:
first mechanical threaded fasteners;
motors, each motor in mechanical communication with a corresponding first threaded fastener; and
a controller in electrical communication with the motors, and each battery tray further includes second threaded fasteners, each second threaded fastener aligned with a corresponding first threaded fastener,
wherein the controller sends a first signal to each motor that causes a corresponding first threaded fastener to mechanically engage the second threaded fastener, and the controller sends a second signal to each motor that causes the corresponding first threaded fastener to mechanically disengage from the respective second threaded fastener.

* * * * *